US007986783B2

(12) United States Patent
Ikushima et al.

(10) Patent No.: US 7,986,783 B2
(45) Date of Patent: Jul. 26, 2011

(54) DATA TRANSMITTING APPARATUS

(75) Inventors: Tsuyoshi Ikushima, Nara (JP); Satoshi Furusawa, Osaka (JP); Tomokazu Sada, Osaka (JP); Masaru Fuse, Osaka (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 1029 days.

(21) Appl. No.: 11/882,250

(22) Filed: Jul. 31, 2007

(65) Prior Publication Data
US 2008/0063109 A1 Mar. 13, 2008

(30) Foreign Application Priority Data

Aug. 4, 2006 (JP) ................................ 2006-213698

(51) Int. Cl.
*H04L 25/34* (2006.01)
(52) U.S. Cl. .......... 380/212; 375/286; 380/30; 380/239; 398/183
(58) Field of Classification Search .................. 398/183; 380/30, 32, 41, 212, 239, 259–260, 262–264, 380/268, 277, 255; 713/500–503, 600–601; 375/286, 367
See application file for complete search history.

(56) References Cited

U.S. PATENT DOCUMENTS

| 5,515,437 | A | * | 5/1996 | Katta et al. | 380/217 |
| 5,706,346 | A | * | 1/1998 | Katta et al. | 380/217 |
| 5,912,969 | A | * | 6/1999 | Sasamoto et al. | 705/57 |
| 6,009,135 | A | * | 12/1999 | Ozluturk | 375/377 |
| 6,449,569 | B1 | * | 9/2002 | Melanson | 702/65 |
| 6,487,261 | B2 | * | 11/2002 | Iwamatsu et al. | 375/346 |
| 7,471,790 | B2 | * | 12/2008 | Yoshida et al. | 380/28 |
| 7,813,433 | B2 | * | 10/2010 | Moffatt | 375/260 |
| 2001/0009574 | A1 | * | 7/2001 | Iemura | 375/322 |
| 2002/0085716 | A1 | * | 7/2002 | Abdulkader | 380/205 |
| 2006/0072753 | A1 | * | 4/2006 | Nishimura | 380/262 |
| 2007/0183593 | A1 | * | 8/2007 | Yoshida et al. | 380/28 |
| 2008/0044011 | A1 | * | 2/2008 | Yoshida et al. | 380/28 |

FOREIGN PATENT DOCUMENTS

JP 2005-057313 3/2005

\* cited by examiner

*Primary Examiner* — Benjamin E Lanier
*Assistant Examiner* — Hadi Armouche
(74) *Attorney, Agent, or Firm* — Wenderoth, Lind & Ponack, L.L.P.

(57) ABSTRACT

A data transmitting apparatus has improved security against eavesdropping for secret communication using Y-00 protocol. The multi-level code generation section generates, based on key information, a multi-level code sequence in which a signal level changes so as to be approximately random numbers. The multi-level processing section generates a multi-level signal having a level which corresponds to a combination between information data and the multi-level code sequence. The error signal generation section generates an error signal which changes randomly. The accumulation section accumulates the error signal, and outputs an accumulated error signal. The adding section adds the accumulated error signal to the multi-level signal, and outputs a variable multi-level signal. The modulator section modulates the variable multi-level signal, and outputs a modulated signal.

19 Claims, 20 Drawing Sheets

F I G. 1 7
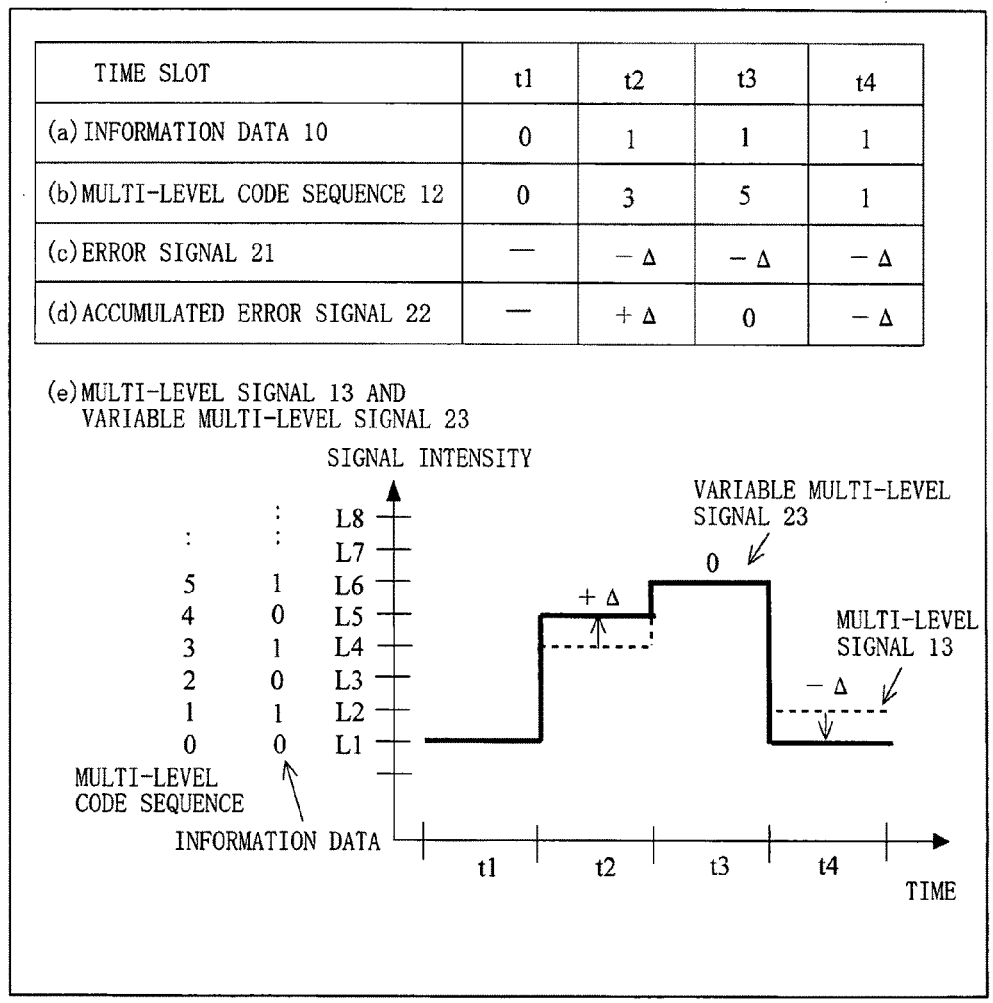

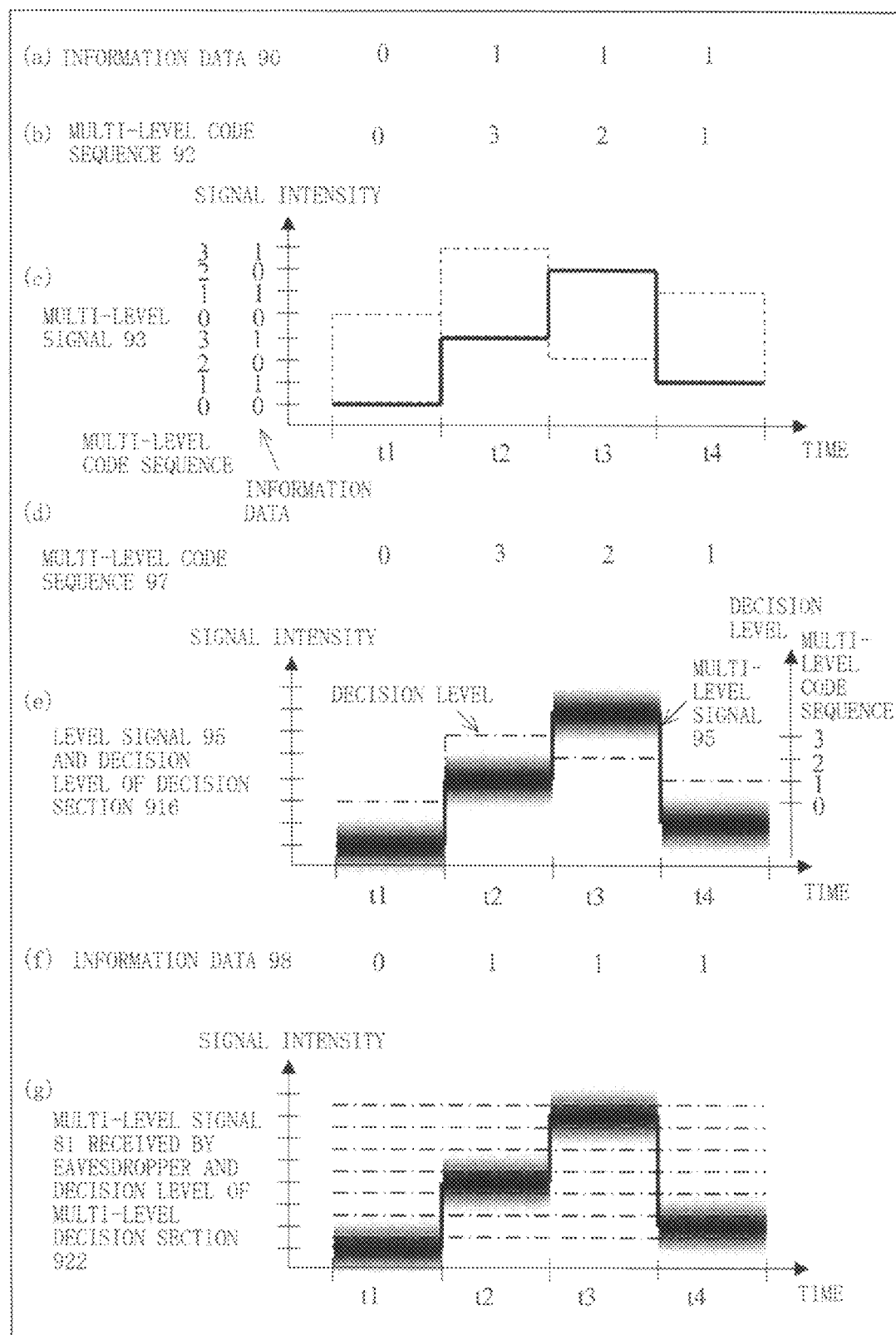

DATA TRANSMITTING APPARATUS

BACKGROUND OF THE INVENTION

1. Field of the Invention

The present invention relates to an apparatus for performing secret communication in order to avoid illegal eavesdropping and interception by a third party. More specifically, the present invention relates to a data transmitting apparatus for performing data communication through selecting and setting a specific encoding/decoding (modulation/demodulation) method between a legitimate transmitter and a legitimate receiver.

2. Description of the Background Art

Conventionally, in order to perform communication between specific parties, there has been adopted a structure for realizing secret communication by sharing original information (key information) for encoding/decoding between transmitting and receiving ends and by performing, based on the original information, an operation/inverse operation on information data (plain text) to be transmitted, in a mathematical manner.

On the other hand, there have been suggested, in recent years, several encryption methods, which positively utilize physical phenomena occurring in a transmission line. As one of the encryption methods, there is a method called Y-00 protocol performing the secret communication by utilizing a quantum noise generated in an optical transmission line. An exemplary transmitting apparatus utilizing the Y-00 protocol method is disclosed in Japanese Laid-Open Patent Publication No. 2005-57313 (hereinafter referred to as Patent Document 1).

FIG. 18 is a block diagram showing an exemplary configuration of a conventional transmitting and receiving apparatus using the Y-00 protocol. As shown in FIG. 18, a transmitting section 901 includes a first multi-level code generation section 911, a multi-level processing section 912, and a modulator section 913. A receiving section 902 includes a demodulator section 915, a second multi-level code generation section 914, and a decision section 916. The transmitting section 901 and the receiving section 902 previously retain first key information 91 and second key information 96, respectively, which are identical in content to each other. The first multi-level code generation section 911 generates, based on the first key information 91, a multi-level code sequence 92, which is a multi-level pseudo random number series having M values from "0" to "M−1".

The multi-level processing section 912 combines information data 90 and the multi-level code sequence 92, and generates a signal, which has a level corresponding to a combination between a level of the information data 90 and a level of the multi-level code sequence 92, as a multi-level signal 93. Specifically, the multi-level processing section 912 generates the multi-level signal 93, which is an intensity-modulated signal, by using a signal format as shown in FIG. 19. That is, the multi-level processing section 912 divides signal intensity of the multi-level code sequence 92 into 2M levels, makes, from these levels, M combinations each having 2 levels, and allocates "0" of the information data 90 to one level of each of the M combinations, and "1" of the information data 90 to the other level of each of the M combinations. The multi-level processing section 912 allocates "0" and "1" of the information data 90 such that the levels corresponding to "0" and "1" are evenly distributed over the whole of the 2M levels. In an example shown in FIG. 19, "0" and "1" are allocated alternately.

In accordance with a value of the multi-level code sequence 92 to be inputted, the multi-level processing section 912 selects one combination of the levels of the multi-level code sequence 92 from among the M combinations of levels of the multi-level code sequence 92. Next, in accordance with a value of the information data 90, the multi-level processing section 912 selects one level of the selected one combination of the multi-level code sequence 92, and generates the multi-level signal 93 including the one level having been selected. In Patent Document 1, the first multi-level code generation section 911 is described as a transmitting pseudo random number generation section, the multi-level processing section 912 as a modulation method specification section and a laser modulation driving section, the modulator section 913 as a laser diode, the demodulator section 915 as a photo detector, the second multi-level code generation section 914 as a receiving pseudorandom number generation section, and the decision section 916 as a determination circuit.

FIG. 20 is a schematic diagram illustrating a signal form used in a conventional transmitting and receiving apparatus. (a), (b), (c), (d), (e), (f), (g) of FIG. 20 shows an exemplary signal change in the case of M=4. For example, in the case where the value of the information data 90 changes "0, 1, 1, 1" (see FIG. 20(a)), and in the case where the value of the multi-level code sequence 92 changes "0, 3, 2, 1" (see FIG. 20(b)), the multi-level signal 93 changes as shown in FIG. 20(c). The modulator section 913 converts the multi-level signal 93 into a modulated signal 94, which is an optical intensity modulated signal, and transmits the modulated signal 94 via an optical transmission line 910.

The demodulator section 915 performs photoelectric conversion of the modulated signal 94 having been transmitted via the optical transmission line 910, and outputs a multi-level signal 95. The second multi-level code generation section 914 generates, based on the second key information 96, a multi-level code sequence 97, which is a multi-level pseudo random number series, and which is identical to the multi-level code sequence 92. The decision section 916 determines, based on a value of the multi-level code sequence 97, which one of a combination of signal levels shown in FIG. 19 is used as the multi-level signal 95, and decides, in binary, two signal levels included in the combination.

Specifically, the decision section 916 sets a decision level in accordance with the value of the multi-level code sequence 97, as shown in FIG. 20(e), and decides whether the multi-level signal 95 is larger (upper) or smaller (lower) than the decision level. In this example, decisions made by the decision section 916 are "lower, lower, upper, and lower". Next, the decision section 916 decides that a lower side is "0" and an upper side is "1" in the case where the multi-level code sequence 97 is even-numbered, and also decides that the lower side is "1" and the upper side is "0" in the case where the multi-level code sequence 97 is odd-numbered. The decision section 916 then outputs information data 98. In this example, the multi-level code sequence 97 is composed of "even number, odd number, even number, and odd number", and thus the information data 98 comes to be "0, 1, 1, 1", in turn. Although the multi-level signal 95 includes a noise, as long as a signal intensity is selected appropriately, it is possible to suppress the noise to the extent that occurrence of an error at the time of a binary decision can be ignored.

Next, possible eavesdropping will be described. An eavesdropper attempts decryption of information data 90 or the first key information 91 from the modulated signal 94 without having key information which is shared between the transmitting and receiving parties. In the case where the eavesdropper performs the binary decision in the same manner as the legitimate receiving party, since the eavesdropper does not have the key information, the eavesdropper needs to attempt decision of all possible values that the key information may take. In this method, the number of such attempts increases exponentially with respect to a length of the key information. Accordingly, if the length of the key information is significantly long, the method is not practical.

As an effective method, it is assumed that the eavesdropper performs a multi-level decision with respect to a multi-level signal 81, which is obtained through the photoelectric conversion by using a demodulator section 921, using a multi-level decision section 922, and decrypts a received sequence 82 using a decrypting section 923, thereby attempting decryption of the information data 90 or the first key information 91. In the case of using such decryption method, if the eavesdropper can perform multi-level decision with respect to the received sequence 82 without mistake, the eavesdropper can decrypts the first key information 91 from the received sequence 82 at a first attempt.

However, when the demodulator section 921 performs the photoelectric conversion, a shot noise is generated, and the generated shot noise will be overlapped on the multi-level signal 81. It is known that the shot noise definitely occurs in accordance with the principle of quantum mechanics. If an interval between signal levels of the multi-level signal (hereinafter referred to as a "step width") is set significantly smaller than a level of the shot noise, the possibility cannot be ignored that the multi-level signal 81 received based on erroneous decision may take various multi-levels other than a correct signal level. Therefore, the eavesdropper needs to perform decryption in consideration of the possibility that the correct signal level may have a value different from that of a signal level obtained through the decision. In such a case, compared to a case without the erroneous decision (a stream cipher using a random number generator identical to that used for the first multi-level code generation section 911), the number of attempts, that is, computational complexity required for decryption is increased. As a result it is possible to improve security against the eavesdropping.

In order to perform high quality communication between the transmitting party and the legitimate receiving party, a difference between the levels which correspond to information data "1" and "0" included in the combination of the levels of the multi-level signal (hereinafter referred to as an "information amplitude") needs to be significantly larger than a noise level generated at the side of the legitimate receiving party. On the other hand, in order to improve the security, the step width needs to be significantly smaller than the shot noise level. In order to achieve a balance between these two conditions, the multi-level number M of the multi-level code sequence 92 needs to be extremely large (for example, the multi-level number M is several thousand, or several ten thousand or more). However, an increase in a value of the multi-level number M leads to complexity of a hardware configuration, and results in a problem of an increase in apparatus costs.

SUMMARY OF THE INVENTION

Therefore, an object of the present invention is to solve the above-described problems, and to provide a data transmitting apparatus which improves security against eavesdropping without extremely increasing a multi-level number.

The present invention is directed to a data transmitting apparatus for encrypting information data by using previously shared key information and performing secret communication with a receiving apparatus. In order to achieve the above-described object, the data transmitting apparatus of the present invention includes: a multi-level code generation section for generating, based on the key information, a multi-level code sequence in which a signal level changes so as to be approximately random numbers; an error signal generation section for generating an error signal having a value which changes at a same bit rate as the information data; an accumulation section for accumulating the error signal and outputting an accumulated error signal; and a variable multi-level modulator section for, in accordance with the information data, the multi-level code sequence and the accumulated error signal, generating a variable multi-level signal which corresponds to a combination between the information data and the multi-level code sequence and which has a level which changes based on the accumulated error signal, modulating, in a predetermined modulation method, the variable multi-level signal having been generated, and outputting a modulated signal.

Preferably, the variable multi-level modulator section includes: a multi-level processing section for combining, in accordance with predetermined processing, the information data and the multi-level code sequence, and generating a multi-level signal having a level which corresponds to the combination between the information data and the multi-level code sequence; an adding section for adding the multi-level signal to the accumulated error signal, and outputting the variable multi-level signal; and a modulator section for modulating the variable multi-level signal in the predetermined modulation method, and outputting the modulated signal.

Further, the variable multi-level modulator section may have a configuration which includes: an adding section for adding the information data to the accumulated error signal, and outputting variable information data; a multi-level processing section for combining the variable information data and the multi-level code sequence in accordance with predetermined processing, generating a signal having a level which corresponds to a level of a combination between the variable information data and the multi-level code sequence, and outputting the variable multi-level signal; and a modulator section for modulating the variable multi-level signal in the predetermined modulation method, and outputting the modulated signal.

Further, the variable multi-level modulator section may have a configuration which includes: an adding section for adding the multi-level code sequence to the accumulated error signal, and outputting a variable multi-level code sequence; a multi-level processing section for combining the information data and the variable multi-level code sequence in accordance with predetermined processing, generating a signal having a level which corresponds to a combination between the information data and the variable multi-level code sequence, and outputting the variable multi-level signal; and a modulator section for modulating the variable multi-level signal in the predetermined modulation method, and outputting the modulated signal.

Further, the variable multi-level modulator section may have a configuration which includes: a multi-level processing section for combining the information data and the multi-level code sequence in accordance with predetermined processing, and generating a multi-level signal having a level which corresponds to the combination between the information data and the multi-level code sequence; a first modulator section for modulating the multi-level signal in a predetermined modulation method, and outputting a multi-level modulated signal; a second modulator section for modulating the accumulated error signal in the predetermined modulation method, and outputting a modulated accumulated error signal; and an adding section for adding the multi-level modulated signal to the modulated accumulated error signal, and outputting a resultant signal as the modulated signal of the modulated variable multi-level signal.

Preferably, data transmitting apparatus further includes a monitoring section for monitoring the accumulated error signal outputted by the accumulation section, and, in the case where an absolute value of the accumulated error signal exceeds a predetermined criteria value, outputting, to the accumulation section, a recovery signal which provides an instruction to reset a value of the accumulated error signal to a predetermined value.

Further, the data transmitting apparatus may further includes a timing output section for outputting, at a timing of a predetermined cycle, a recovery signal which provides an instruction to reset a value of the accumulated error signal to a predetermined value.

Preferably, a ratio of an information amplitude, which corresponds to an amplitude of the information data, to the predetermined criteria value is larger than a signal-to-noise ratio acceptable to a legitimate receiving party.

Preferably, the accumulation section resets the value of the accumulated error signal to "0" when the recovery signal is inputted.

Preferably, the accumulation section may set the value of the accumulated error signal lower than the predetermined criteria value when the recovery signal is inputted.

Preferably, the error signal generation section includes: a controlling random number generation section for generating a controlling random number having a value which changes randomly at a same bit rate as the information data; and an error signal conversion section for deciding, based on a value of the controlling random number, the value which changes at the same bit rate as the information data, and outputting a resultant value as the error signal.

Preferably, the controlling random number is a pseudo random number generated based on a predetermined initial value. Further, the controlling random number may be a physical random number generated by using physical phenomena.

Preferably, the error signal generation section generates the error signal in accordance with a value of the information data. Alternatively, the error signal generation section generates the error signal in accordance with a transition of a value of the information data. Further alternatively, the error signal generation section generates the error signal in accordance with a value of the multi-level code sequence. Further alternatively, the error signal generation section generates the error signal in accordance with a transition of a value of the multi-level code sequence.

As above described, according to the data transmitting apparatus based on the present invention, the accumulated error signal, in which random variation is accumulated with time, is added to the multi-level signal, and then transmitted, whereby the number of the levels of the multi-level signal, which the eavesdropper may receive, is increased. Accordingly, the eavesdropper needs to perform decryption in consideration of the possibility that the multi-level signal may take various levels, whereby computational complexity required for decryption is increased.

Further, the data transmitting apparatus can increase the number of the levels of the multi-level signal, which may be received by the eavesdropper, even in the case where a noise level overlapped on the multi-level signal is smaller than a step width of the multi-level signal. Accordingly, the data transmitting apparatus can improve the security against the eavesdropping without increasing the multi-level number included in the multi-level signal. Further, since the data transmitting apparatus is not required to increase the multi-level number included in the multi-level signal, it is possible to simplify an apparatus configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a schematic diagram illustrating a signal form used for the data communication apparatus 3b according to the third embodiment of the present invention;

FIG. 20 is a schematic diagram illustrating a signal form used for the conventional transmitting and receiving apparatus.

DETAILED DESCRIPTION OF THE PRESENT INVENTION

Hereinafter, with reference to drawings, respective embodiments of the present invention will be described.

First Embodiment

Figure 1:
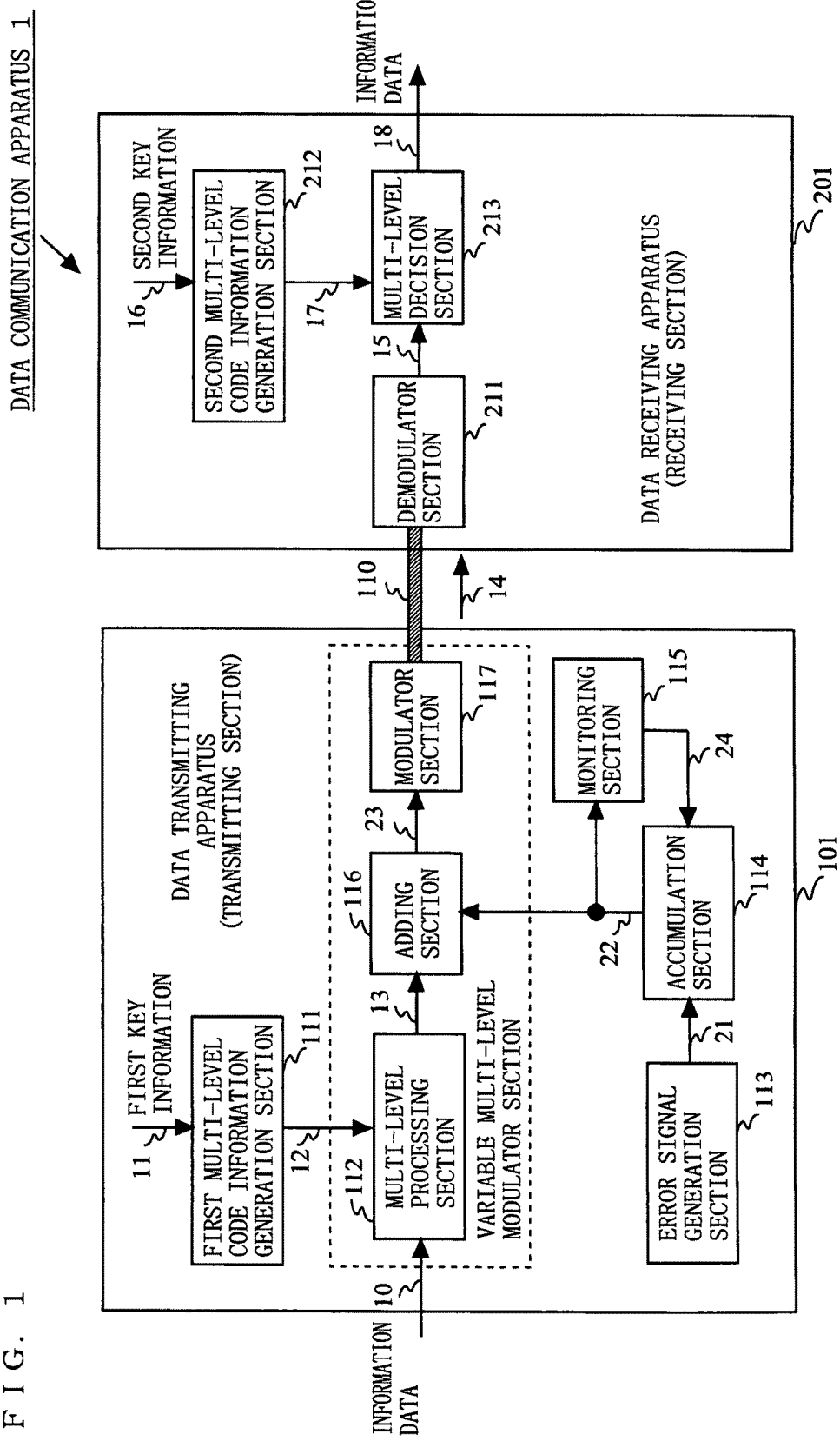
FIG. 1 is a block diagram showing an exemplary configuration of a data communication apparatus 1 according to a first embodiment of the present invention.

FIG. 1 is a block diagram showing an exemplary configuration of a data communication apparatus 1 according to a first embodiment of the present invention. As shown in FIG. 1, the data communication apparatus 1 has a configuration in which a data transmitting apparatus (hereinafter referred to as a transmitting section) 101 and a data receiving apparatus (hereinafter referred to as a receiving section) 201 are connected to each other via a transmission line 110. The transmitting section 101 includes a first multi-level code generation section 111, a multi-level processing section 112, an error signal generation section 113, an accumulation section 114, a monitoring section 115, an adding section 116, and a modulator section 117. The receiving section 201 includes a demodulator section 211, a second multi-level code generation section 212, and a decision section 213. As the transmission line 110, a metal line such as a LAN cable or a coaxial line, or an optical waveguide such as an optical-fiber cable can be used. Further, the transmission line 110 is not limited to a wired cable such as the LAN cable, but can be free space which enables a wireless signal to be transmitted.

Figure 19:
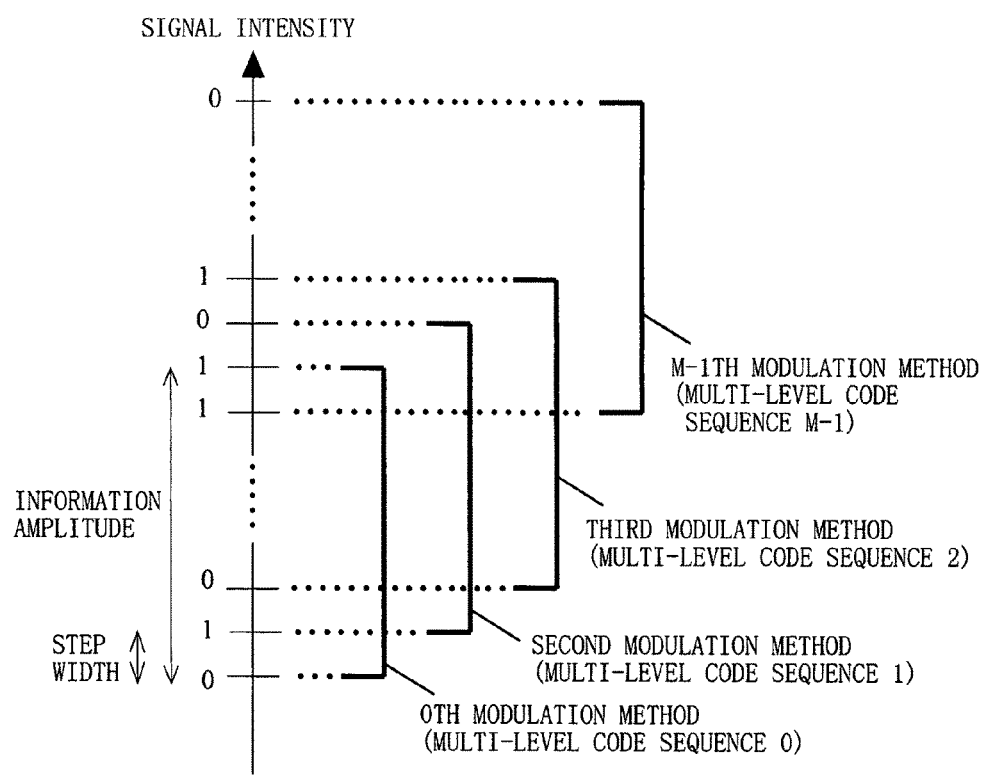
FIG. 19 is a schematic diagram illustrating allocation of signal levels in the conventional transmitting and receiving apparatus using the Y-00 protocol.

The transmitting section 101 and the receiving section 201 have, in advance, first key information 11 and second key information 16, respectively, which are identical to each other in content. In the transmitting section 101, the first multi-level code generation section 111 sets the first key information 11 as an initial value, and generates and outputs a multi-level code sequence 12, which is a multi-level pseudo random number sequence. A signal form of the multi-level code sequence 12 may be either a multi-level serial signal or a binary parallel signal. In the same manner as an example of a conventional art described with reference to FIG. 19, the multi-level processing section 112 combines information data 10 and a multi-level code sequence 12 in accordance with a predetermined procedure, and generates, as a multi-level signal 13, a signal having a level corresponding to a combination of a level of the information data 10 and a level of the multi-level code sequence 12.

In accordance with a predetermined method, the error signal generation section 113 generates an error signal 21 having a value which changes at the same bit rate as the information data 10. The accumulation section 114 accumulates the error signal 21 and outputs an accumulated error signal 22. The monitoring section 115 monitors a value of the accumulated error signal 22, and in the case where an absolute value of the accumulated error signal 22 exceeds a predetermined criteria value, the monitoring section 115 outputs a recovery signal 24 to the accumulation section 114. The recovery signal 24 is a signal providing an instruction to return a value of the accumulated error signal 22 to a predetermined value. The adding section 116 adds the accumulated error signal 22 to the multi-level signal 13, and outputs a variable multi-level signal 23. That is, the variable multi-level signal 23 is a signal which corresponds to the combination of the information data 10 and the multi-level code sequence 12, and has a level varying based on the accumulated error signal 22. The modulator section 117 modulates the variable multi-level signal 23 in a predetermined modulation method, and outputs a modulated signal 14 to the transmission line 110.

The multi-level processing section 112, the adding section 116, and the modulator section 117 are configured so as to generate the above-described variable multi-level signal 23 in accordance with the information data 10, the multi-level code sequence 12 and the accumulated error signal 22, to modulate the generated variable multi-level signal 23, and to output the modulated signal 14. Therefore, the multi-level processing section 112, the adding section 116, and the modulator section 117 may be collectively described as a variable multi-level modulator section.

Figure 18:
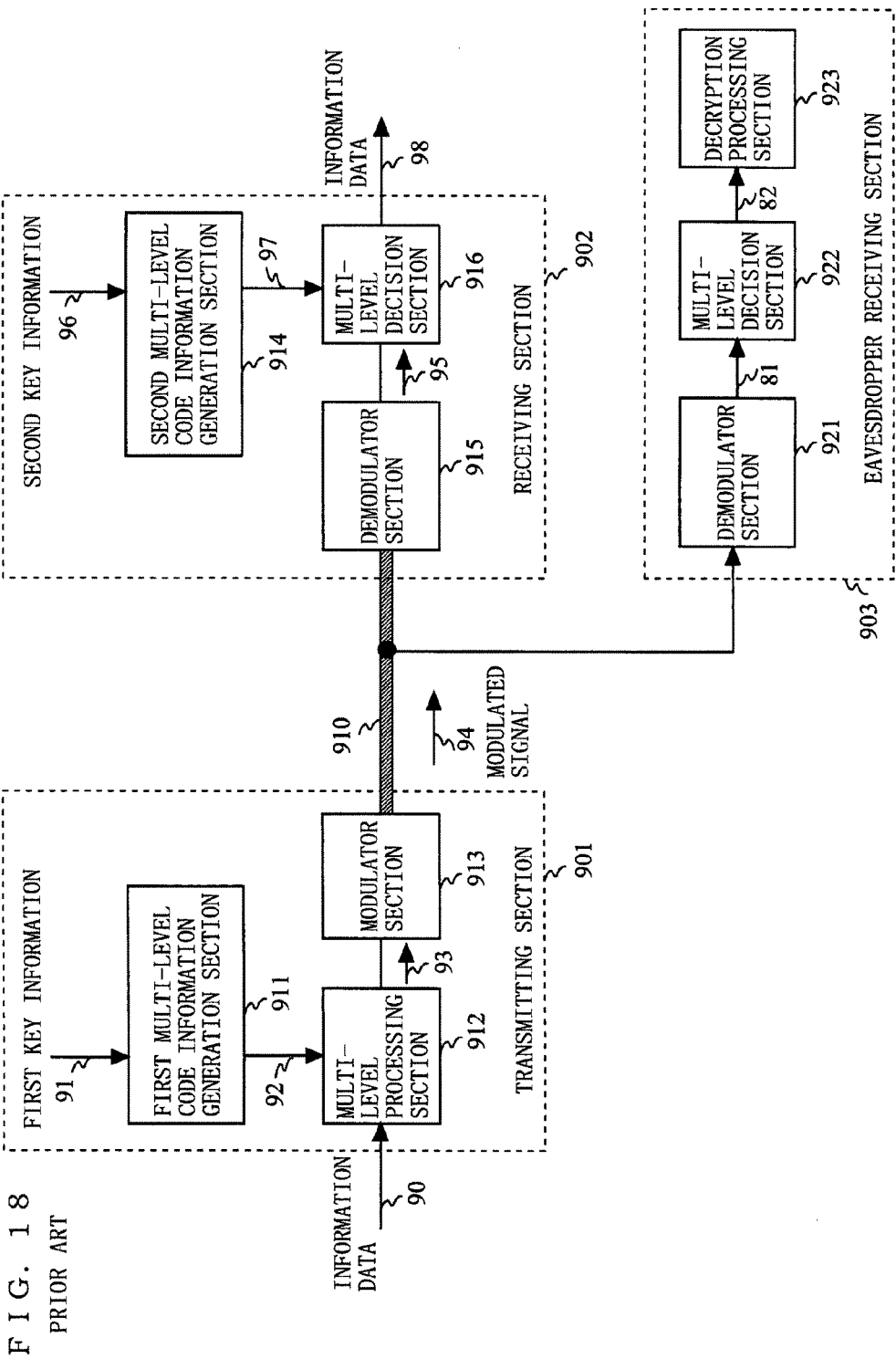
FIG. 18 is a block diagram showing an exemplary configuration of a conventional transmitting and receiving apparatus using a Y-00 protocol.

In the receiving section 201, the demodulator section 211 demodulates the modulated signal 14, which is transmitted via the transmission line 110, and reproduces a multi-level signal 15. The second multi-level code generation section 212 sets the second key information 16 as an initial value, in the same manner as the first multi-level code generation section 111, and generates and outputs a multi-level code sequence 17, which is a multi-level pseudo random number sequence. The decision section 213 decides (binary decision) the multi-level signal 15 in accordance with the multi-level code sequence 17, and then reproduces information data 18. With regard to respective component parts of the above-described receiving section 201, the receiving section 201 basically has the same configuration as the receiving section 902 according to the conventional art described with reference to FIG. 18.

Figure 2:
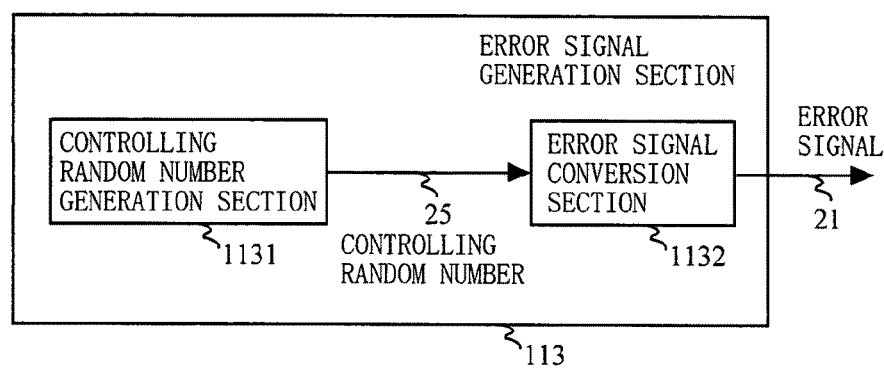
FIG. 2 is a block diagram showing an exemplary configuration of an error signal generation section 113.

In the present embodiment, the error signal generation section 113 generates the error signal 21 in accordance with a random number which is different from the information data 10 or the multi-level code sequence 12. FIG. 2 is a block diagram showing an exemplary configuration of the error signal generation section 113. As shown in FIG. 2, the error signal generation section 113 includes a controlling random number generation section 1131, and an error signal conversion section 1132. The controlling random number generation section 1131 generates a controlling random number 25 having a value which randomly varies at the same bit rate as the information data 10. The controlling random number 25 may be either a pseudo random number generated based on a predetermined initial value or a physical random number generated by using physical phenomena. The error signal conversion section 132 decides, from the controlling random number 25 to be inputted thereto, a value which randomly varies at the same bit rate as the information data 10 in accordance a predetermined rule, and outputs the decided value as the error signal 21.

Figure 3:
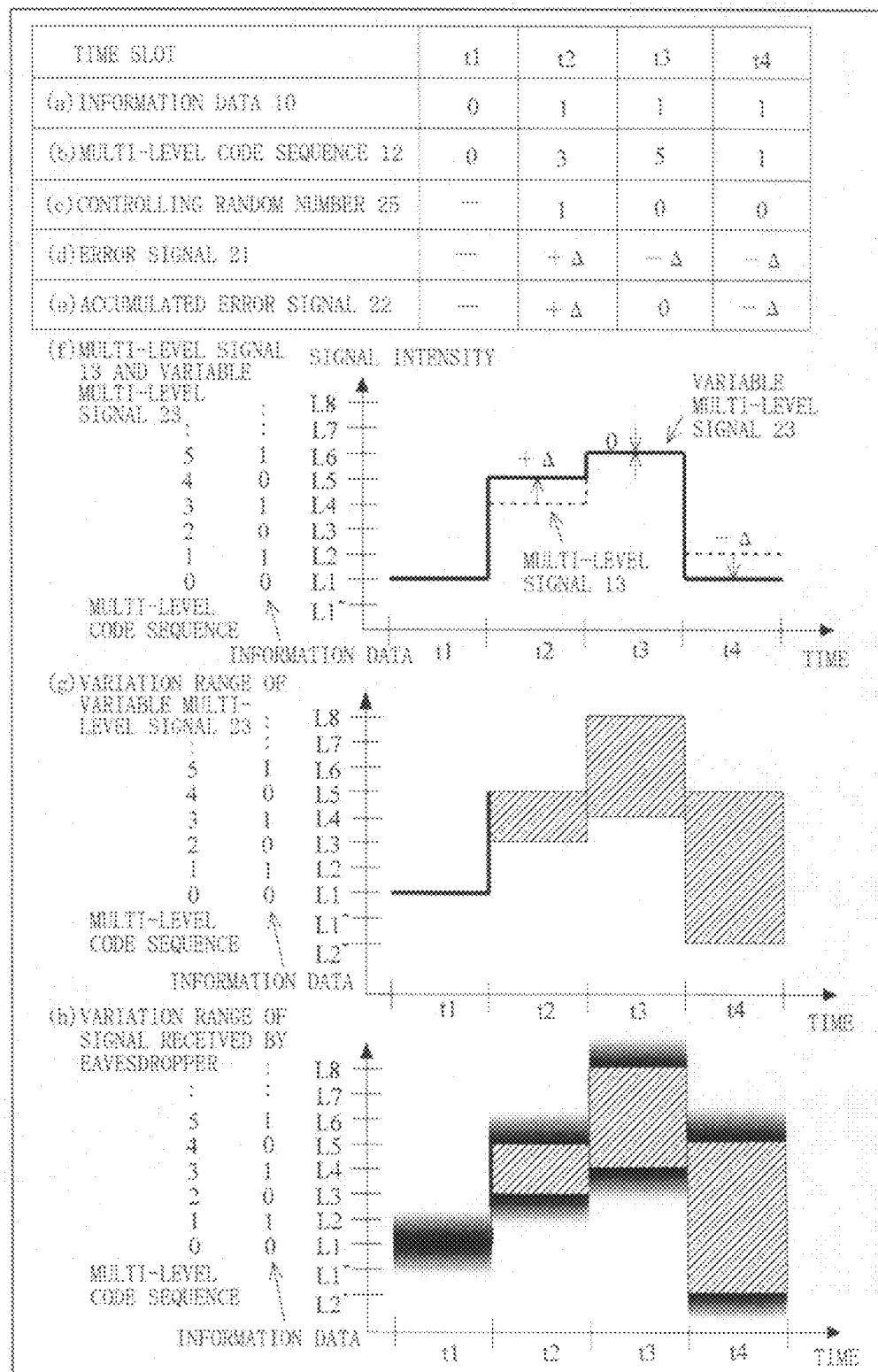
FIG. 3 is a schematic diagram illustrating a signal form used for the data communication apparatus 1 according to the first embodiment of the present invention.

Next, a temporal change of a signal used in the present embodiment will be described by using FIG. 3 as an example. FIG. 3 is a schematic diagram illustrating a signal form used for the data communication apparatus 1 according to the first embodiment of the present invention. In FIG. 3, a case will be considered where values of the information data 10, the multi-level code sequence 12, and the controlling random number 25 in respective timeslots (t1 to t4) have those values, respectively, as indicated in (a), (b), and (c) of FIG. 3. Here, suppose that the step width indicative of an interval between signal levels is Δ, a value of the error signal 21 "+Δ" is allocated to a value of the controlling random number 25 "1", and a value of the error signal 21 "−Δ" is allocated to a value of the controlling random number 25 "0". The value of the error signal 21 in this case is shown in FIG. 3(d). The value of the accumulated error signal 22, which is obtained by accumulating the error signal 21, is shown in FIG. 3(e).

In FIG. 3(f), a change of the multi-level signal 13 in this case is indicated in a dashed line, and a change of the variable multi-level signal 23 is indicated in a continuous line. For example, at time t2, the level of the multi-level signal 13 is L4, whereas the level of the variable multi-level signal 23 is a level (L5) which is obtained by adding the value of the accumulated error signal 22 to the value of the multi-level signal 13. In this manner, the adding section 116 adds the accumulated error signal 22 to the multi-level signal 13 in each of the time slots and generates the variable multi-level signal 23. In each of the time slots, the error signal 21 randomly takes the value of either +Δ or −Δ, and thus a range of a value, which the accumulated error signal 22 may take, expands with time. For example, the value ranges from +Δ to −Δ at time t2, from +2Δ to −2Δ at time t3, and from +3Δ to −3Δ at time t4.

Therefore, a variation range of the variable multi-level signal 23 also expands with time as shown in FIG. 3(g). The shot noise is added to a signal received by an eavesdropper, and thus as shown in FIG. 3(h), a variation range of the signal expands further than that of the variable multi-level signal 23. In order to know the value of the information data 10 or the first key information 11, the eavesdropper needs to decrypt the received signal in consideration of the possibility that the received signal may take all the levels included in the variation range indicated in FIG. 3(h). Accordingly, computational complexity required for the decryption is increased. Since this effect can be obtained even in the case where a noise level included in the received signal is smaller than the step width, the computational complexity required for the decryption can be increased even if the multi-level number of the variable multi-level signal 23 is relatively small.

A relation between the value of the controlling random number 25 and the value of the error signal 21, as above described, is merely an example. The transmitting section 101 may set each of the controlling random number 25 and the error signal 21 to any given value independently of the step width. Further, although a case where the multi-level number is 8 is described in FIG. 3, this is merely an example, and the multi-level number may be set to any number.

When the value of the accumulated error signal 22 becomes too large, the value of the variable multi-level signal 23 will be a value completely different from the original multi-level signal 13, and consequently the legitimate receiving party may not be able to receive the multi-level signal 13 accurately. Therefore, the transmitting section 101 needs to reset the accumulated error signal 22. Hereinafter, a method of resetting the accumulated error signal 22 will be described.

Figure 4:
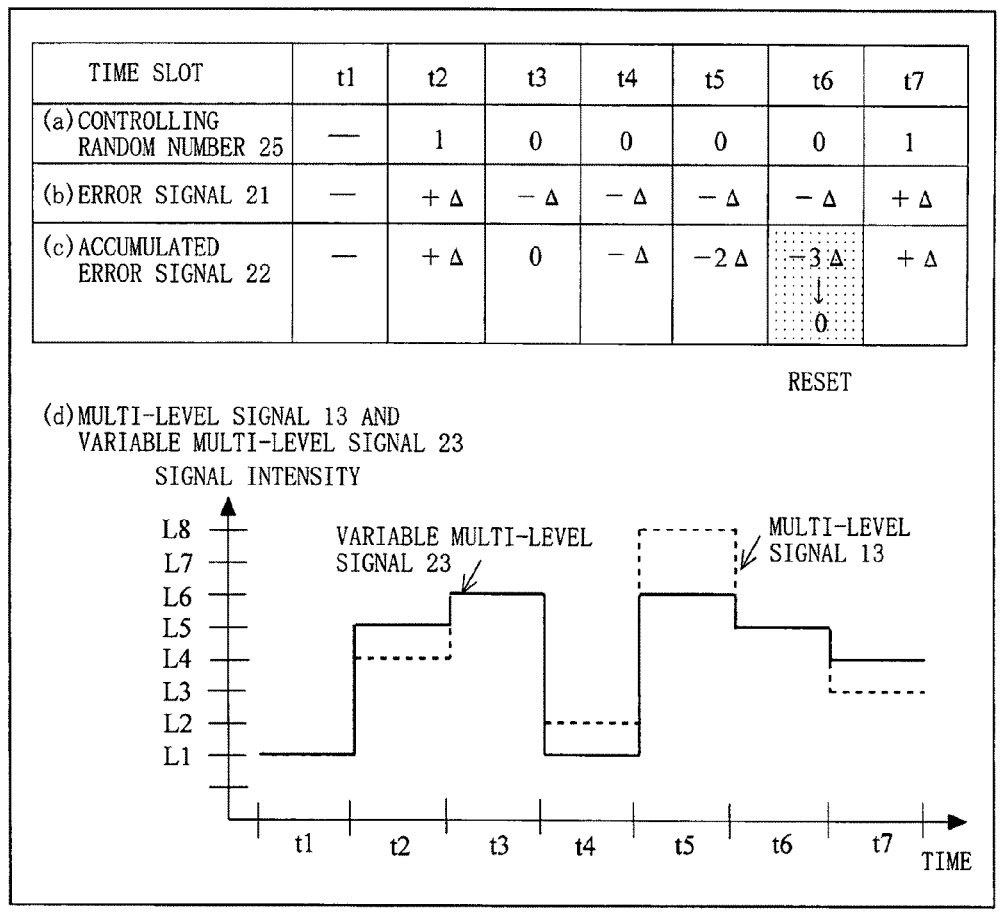
FIG. 4 is a diagram illustrating a method in which a transmitting section 101 resets an accumulated error signal 22.

FIG. 4 is a diagram illustrating a method in which the transmitting section 101 resets the accumulated error signal 22. In this example, when the absolute value of the accumulated error signal 22 is equal to or larger than a criteria value 3Δ, the value of the accumulated error signal is reset to "0". In the case where the controlling random number 25 and the error signal 21 change as shown in (a) and (b) of FIG. 4, respectively, the value of the accumulated error signal 22 will be "−3Δ" at time t6. The absolute value of the accumulated error signal 22 becomes equal to the criteria value 3Δ at time t6, and thus the monitoring section 115 outputs the recovery signal 24 to the accumulation section 114. Upon reception of the recovery signal 24, the accumulation section 114 resets the value of the accumulated error signal 22 to "0", and starts accumulating the error signal 21 again.

Accordingly, the value of the variable multi-level signal 23 and the value of the multi-level signal 13, respectively, change as shown in FIG. 4(d) such that a difference (equivalent to the value of the accumulated error signal 22) between the variable multi-level signal 23 and the multi-level signal 13 does not become equal to or larger than the criteria value of 3Δ. In order for the legitimate receiving party to constantly receive a signal appropriately, a ratio of the information to the criteria value of 3Δ is set larger than a signal-to-noise voltage ratio required by the legitimate receiving party (a required SNR). The criteria value of 3Δ is merely an example, and as long as the relation between the criteria value and the above-described SNR is satisfactory, any given value may be set to the criteria value. Further, the value of the variable multi-level signal 23 after reset is not limited to "0", and may be any given value as long as the absolute value of the variable multi-level signal 23 is lower than the criteria value (for example, ½ of the criteria value).

Figure 5:
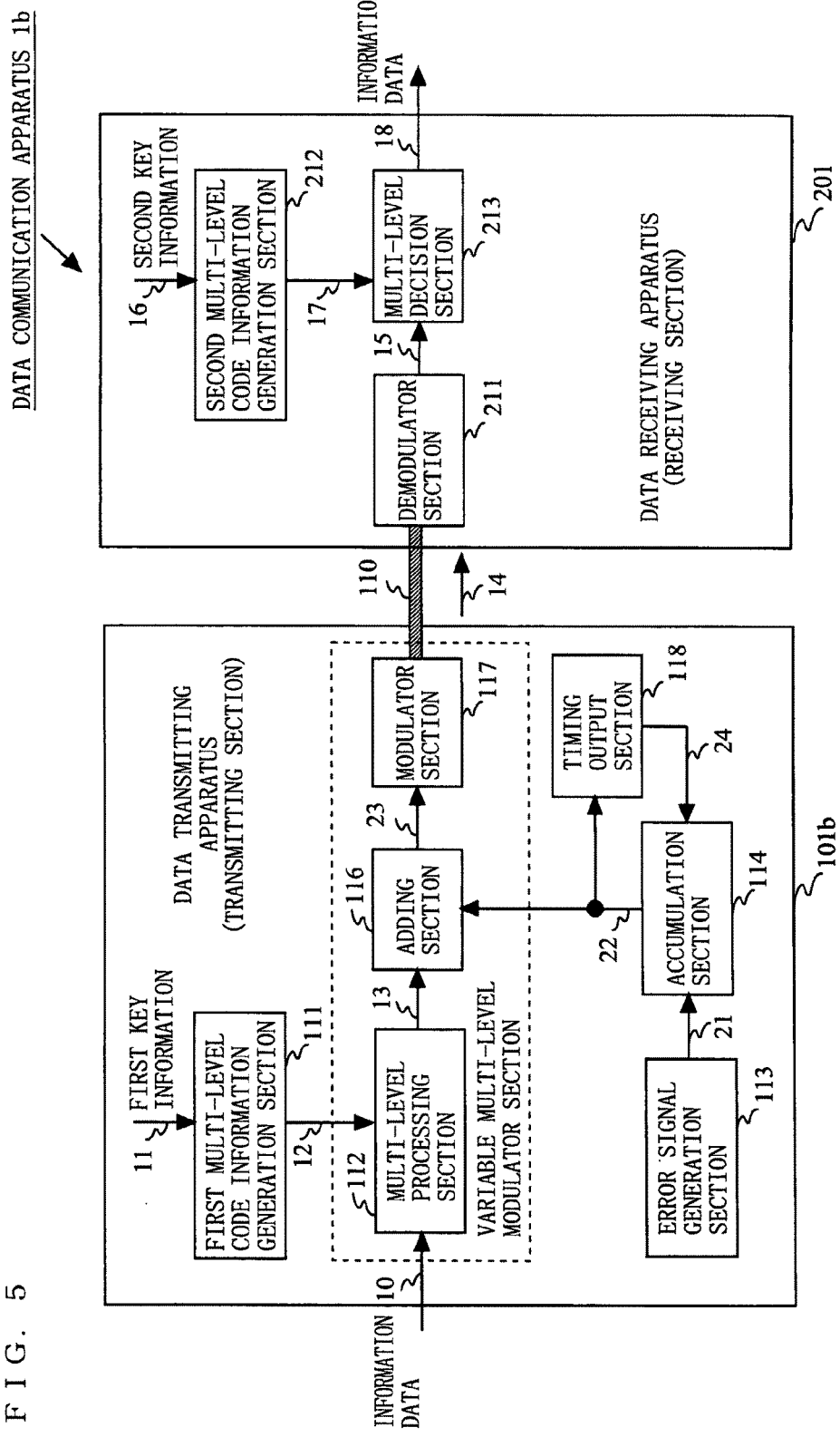
FIG. 5 is a block diagram showing an exemplary configuration of a data communication apparatus 1b according to the first embodiment of the present invention.

Method of resetting the accumulated error signal 22 is not limited to a method using the above-described criteria value. The accumulated error signal 22 may be reset in a predetermined cycle. FIG. 5 shows an exemplary configuration of a data communication apparatus 1b in this case. In the data communication apparatus 1b shown in FIG. 5, the transmitting section 101b includes a monitoring section 115, instead of a timing output section 118. A configuration of the transmitting section 101b is the same as that described with reference to FIG. 1 except for the timing output section 118. The timing output section 118 outputs the recovery signal 24, which provide an instruction to return the value of the accumulated error signal 22 to a predetermined value, to the accumulation section at a timing of a predetermined cycle.

Figure 6:
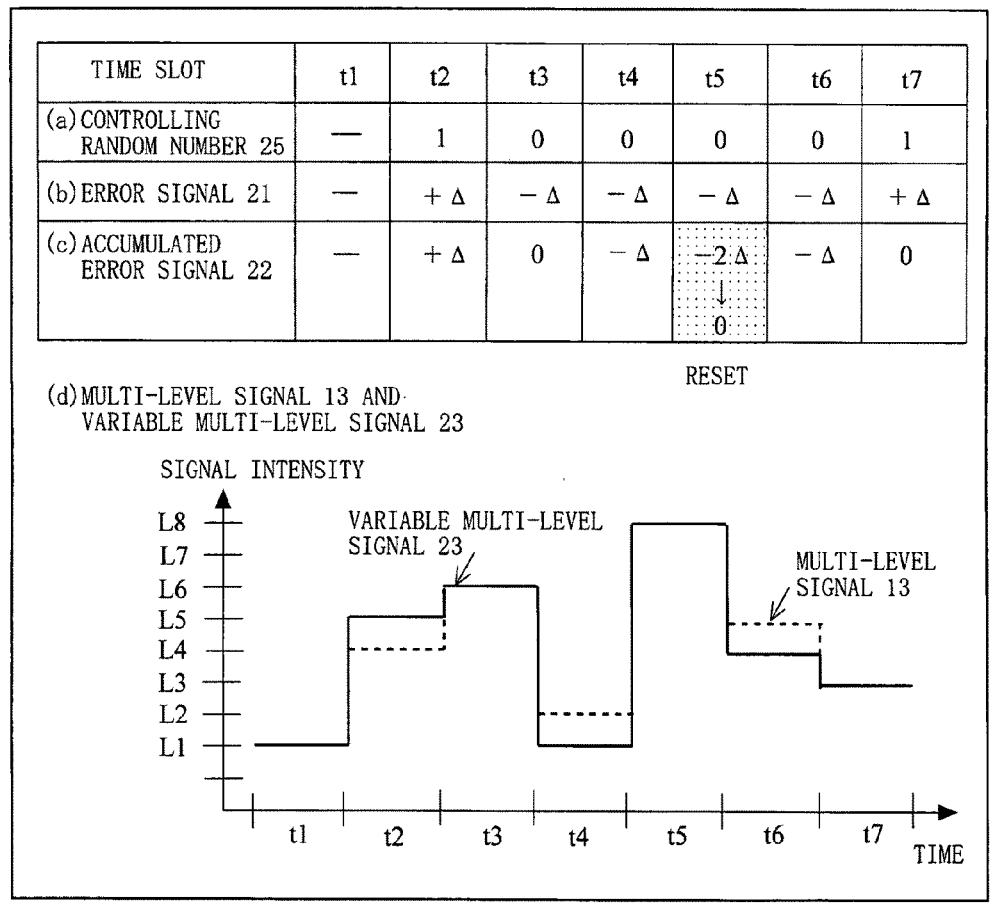
FIG. 6 is a diagram illustrating a method in which a transmitting section 101b resets the accumulated error signal 22.

FIG. 6 is a diagram illustrating a method in which the transmitting section 101b resets the accumulated error signal 22. In an example shown in FIG. 6, the value of the accumulated error signal 22 is reset every 4 symbols. That is, the timing output section 118 outputs the recovery signal 24 to the accumulation section 114 at time t5 after 4 symbols from t1. Upon reception of the recovery signal 24, the accumulation section 114 resets the value of the accumulated error signal 22 to "0", and starts accumulating the accumulated error signal 22 again.

Accordingly, the value of the variable multi-level signal 23 and the value of the multi-level signal 13 change as shown in FIG. 6(d). Here, in order for the legitimate receiving party to constantly receive a signal appropriately, a resetting cycle is set such that a ratio of the information amplitude to a possible maximum value of the accumulated error signal 22 does not exceed the required SNR of the legitimate receiving party. A cycle of resetting every 4 symbols is merely an example, and as long as a relation between the above-described ratio of the information amplitude to a possible maximum value of the accumulated error signal 22 and the above-described required SNR is satisfactory, any given value may be set as the cycle of resetting. In this case, the value of the variable multi-level signal 23 after reset is not limited to "0", and the value may be any given value as long as the absolute value of the variable multi-level signal 23 is lower than the possible maximum value which the accumulated error signal 22 may take.

Figure 7:
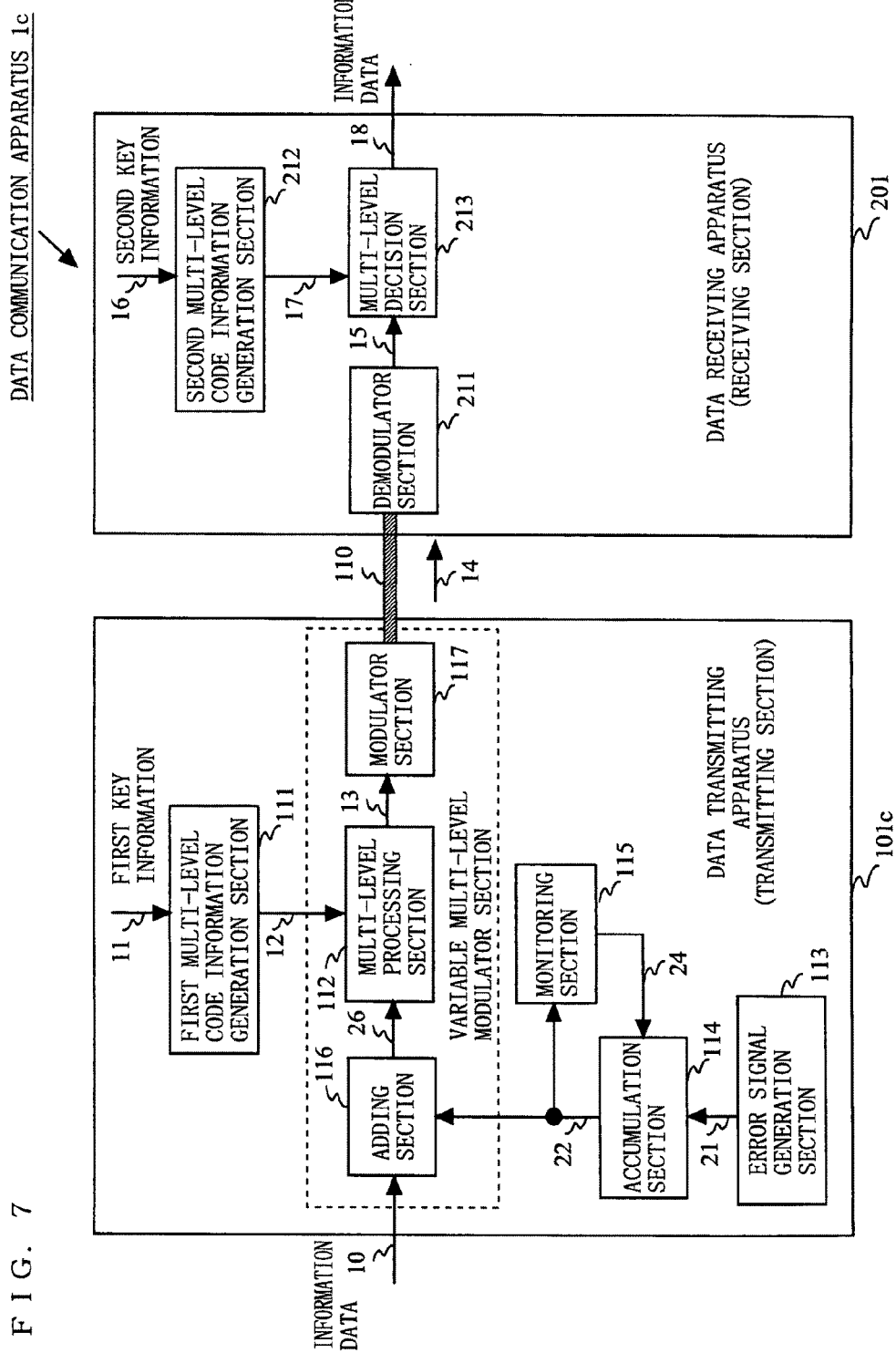
FIG. 7 is a block diagram showing an exemplary configuration of a data communication apparatus 1c according to the first embodiment of the present invention.
Figure 8:
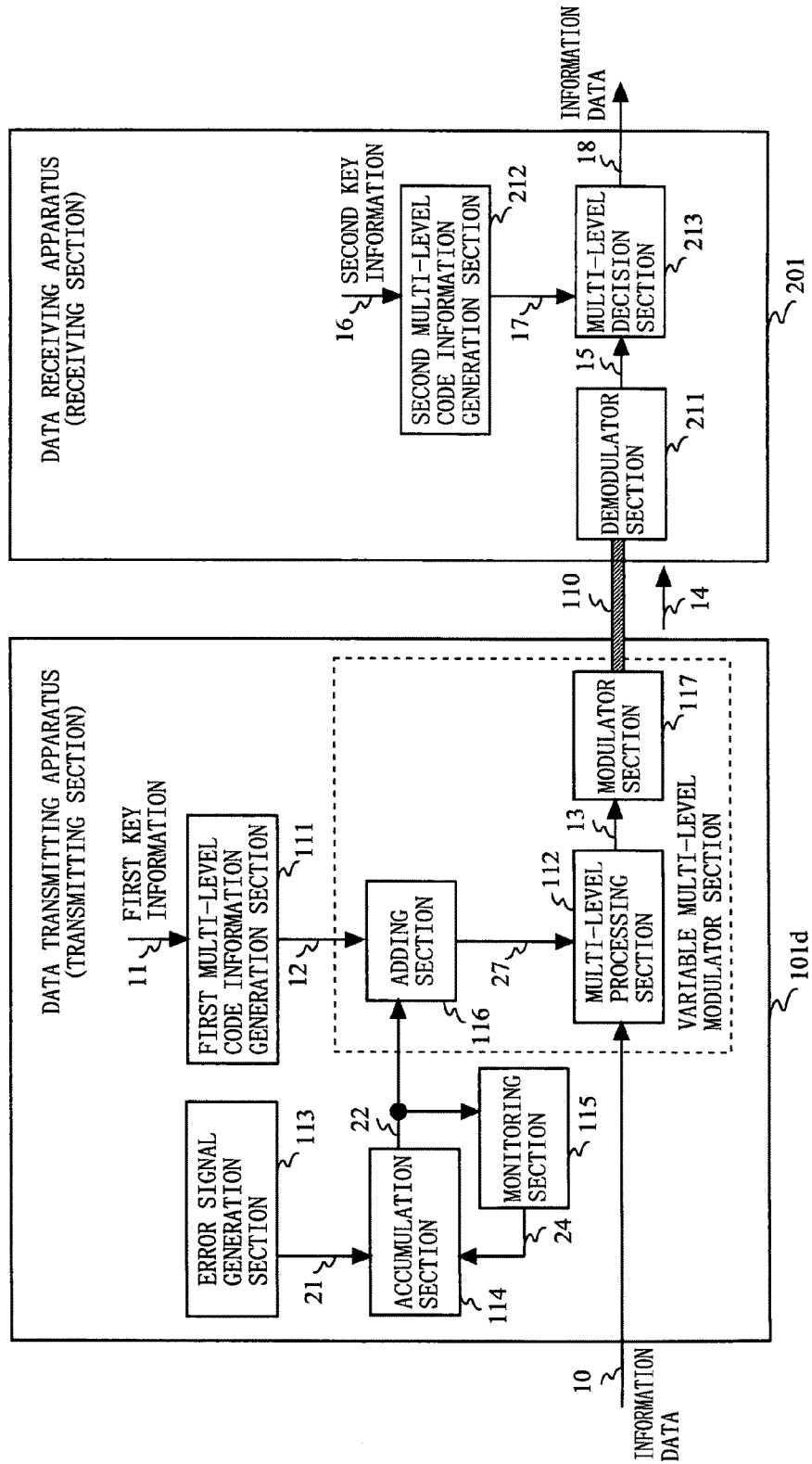
FIG. 8 is a block diagram showing an exemplary configuration of a data communication apparatus 1d according to the first embodiment of the present invention.
Figure 9:
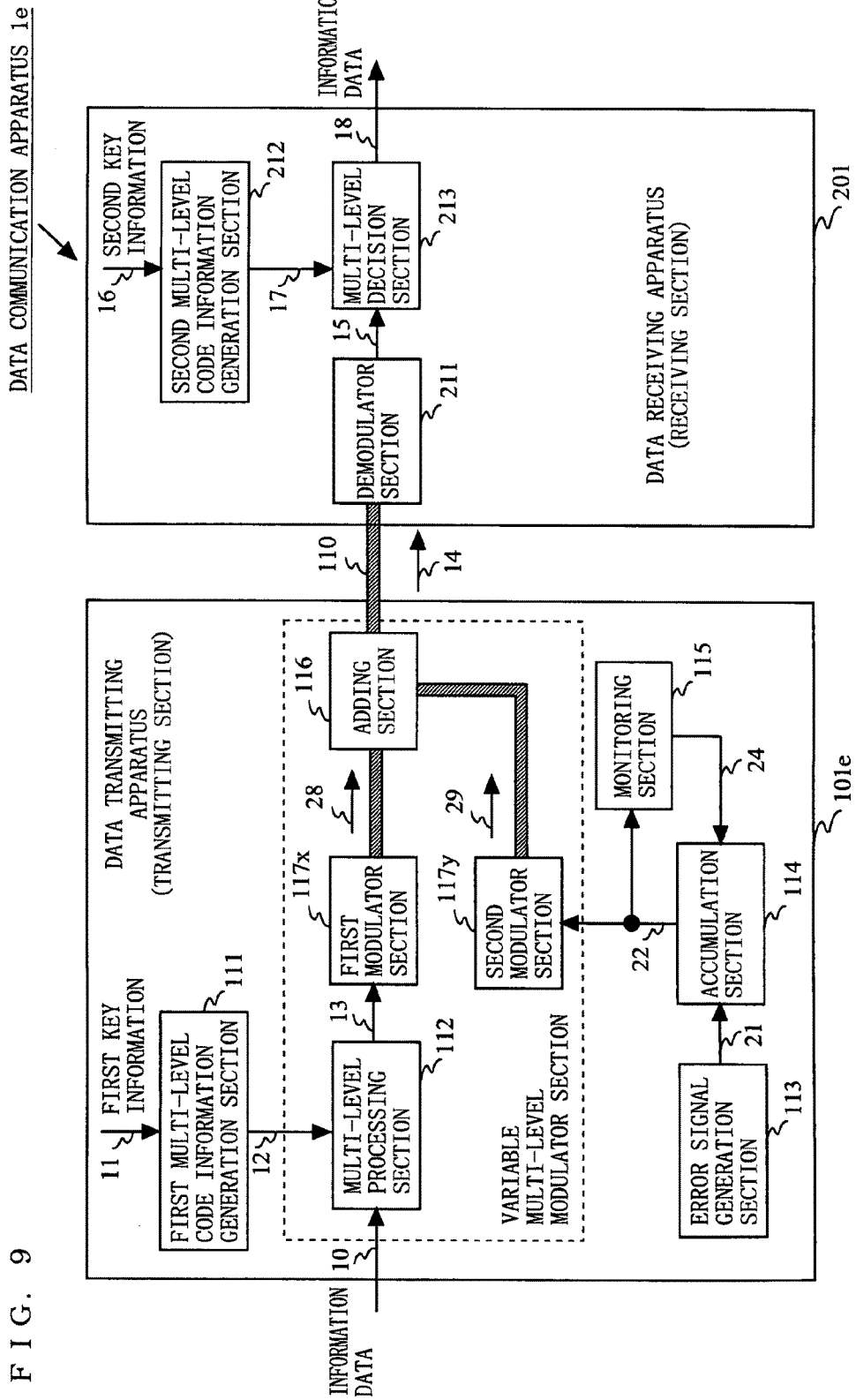
FIG. 9 is a block diagram showing an exemplary configuration of a data communication apparatus 1e according to the first embodiment of the present invention.

The data communication apparatus according to the present embodiment may be configured with not only those configurations as shown in FIGS. 1 to 5, but also with configurations as shown in FIGS. 7 to 9. In data communication apparatuses 1c to 1e shown in FIGS. 7 to 9, a position of the adding section 116 is different from that shown in FIG. 1. In the data communication apparatus 1c shown in FIG. 7, the adding section 116 adds the information data 10 to the accumulated error signal 22, and outputs variable information data 26 to the multi-level processing section 112. That is, the variable information data 26 is a signal obtained by varying a level of the information data 10 using the accumulated error signal 22. The multi-level processing section 112 combines the variable information data 26 and the multi-level code sequence 12 in accordance with a predetermined procedure, and generates a signal having a level corresponding to a combination between a level of the variable information data 26 and a level of the multi-level code sequence 12, as a multi-level signal 13. The modulator section 117 modulates the multi-level signal 13 in a predetermined modulation method, and outputs the modulated signal 14 to the transmission line 110. Operations of remaining functional blocks are the same as those in FIG. 1.

In the data communication apparatus 1d shown in FIG. 8, the adding section 116 adds the multi-level code sequence 12 to the accumulated error signal 22, and outputs variable multi-level code sequence 27 to the multi-level processing section 112. The multi-level processing section 112 combines the information data 10 and the variable multi-level code sequence 27 in accordance with a predetermined procedure, and generates, as the multi-level signal 13, a signal having a level corresponding to a combination between the level of the information data 10 and a level of the variable multi-level code sequence 27. The modulator section 117 modulates the multi-level signal 13 in the predetermined modulation method, and outputs the modulated signal 14 to the transmission line 110. Operations of remaining functional blocks are the same as those in FIG. 1.

In the data communication apparatus 1e shown in FIG. 9, the first modulator section 117x modulates the multi-level signal 13 in a predetermined modulation method, and outputs a multi-level modulated signal 28. The second modulator section 117y modulates the accumulated error signal 22 in a predetermined modulation method, and outputs a modulated accumulated error signal 29. The adding section 116 adds the multi-level modulated signal 28 to the modulated accumulated error signal 29, and transmits the modulated signal 14 to the transmission line 110. Operations of remaining functional blocks are the same as those in FIG. 1. In the data communication apparatus 1e, the multi-level processing section 112, the adding section 116, the first modulator section 117x, and the second modulator section 117y may be collectively described as a variable multi-level modulator section.

In each of the configurations of data communication apparatuses 1c, 1d, and 1e shown in FIGS. 7 to 9, as described with reference to FIGS. 5 and 6, it is possible to have the timing output section 118, instead of the monitoring section 115, so as to reset the accumulated error signal 22 in a predetermined cycle.

As above described, in the data transmitting apparatus 101 according to the first embodiment of the present invention, the accumulated error signal, in which random variation is accumulated with time, is added to the multi-level signal and then transmitted, whereby the number of levels of the multi-level signal which the eavesdropper may receive is increased. Accordingly, the eavesdropper needs to perform decryption in consideration of the possibility that the multi-level signal may take various levels, whereby it is possible to increase a computational complexity required for the decryption.

Further, the data transmitting apparatus 101 can increase the number of the levels of the multi-level signal which the eavesdropper may receive even if a noise level to be overlapped on the multi-level signal is smaller than the step width of the multi-level signal. Accordingly, the data transmitting apparatus 101 can improve security against eavesdropping without increasing the multi-level number included in the multi-level signal. Further, in the data transmitting apparatus 101, since the multi-level number included in the multi-level signal is not required to be increased, it is possible to simplify the configuration of the apparatus.

Second Embodiment

Figure 10:
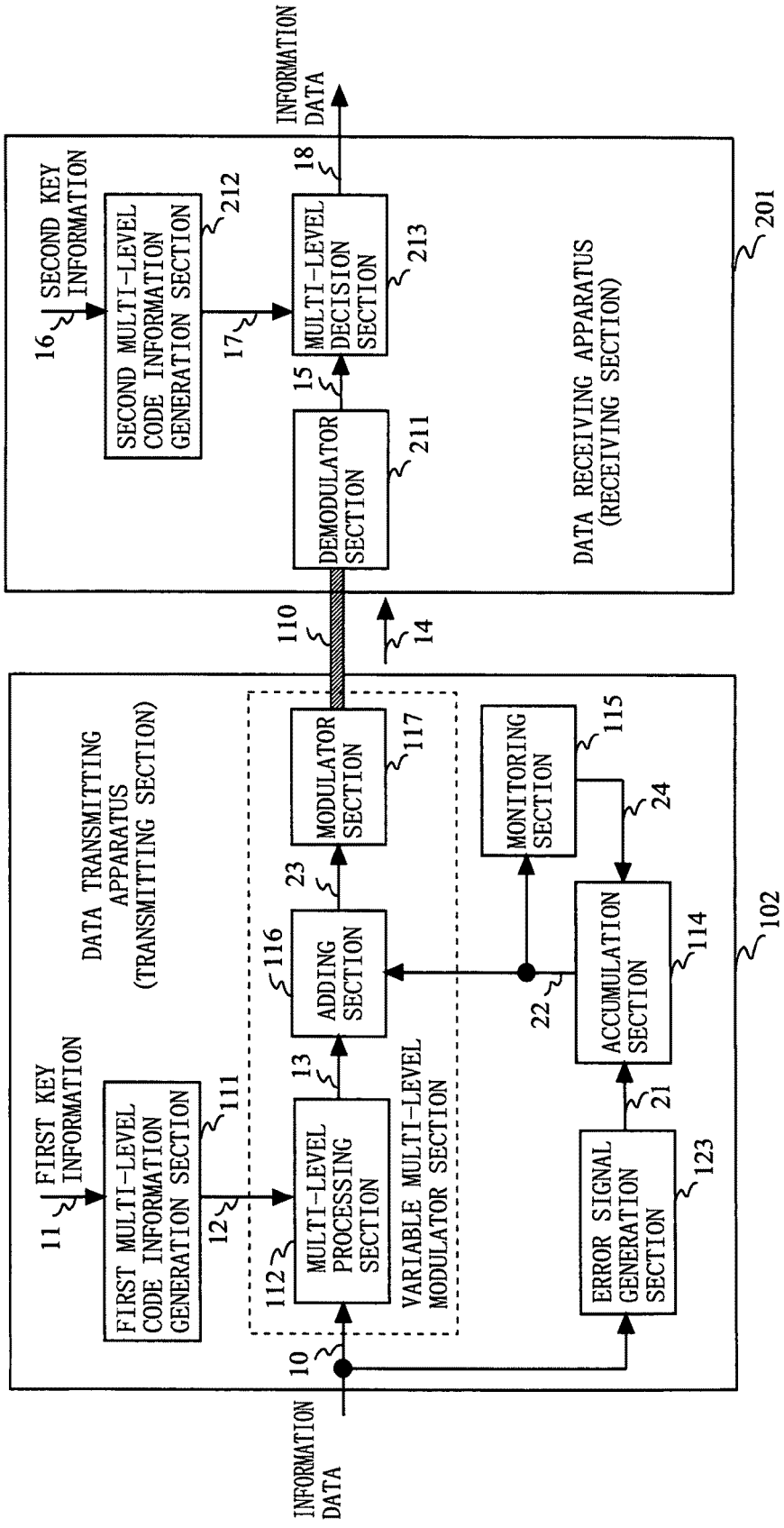
FIG. 10 is a block diagram showing an exemplary configuration of a data communication apparatus 2 according to a second embodiment of the present invention.

FIG. 10 is a block diagram showing an exemplary configuration of a data communication apparatus 2 according to a second embodiment of the present invention. As shown in FIG. 10, the data communication apparatus 2 has a configuration in which a transmitting section 102 and a receiving section 201 are connected to each other via a transmission line 110. The transmitting section 102 includes a first multi-level code generation section 111, a multi-level processing section 112, an error signal generation section 123, a accumulation section 114, a monitoring section 115, an adding section 116, and a modulator section 117. The receiving section 201 includes a demodulator section 211, a second multi-level code generation section 212, and a decision section 213. The data communication apparatus 2 according to the second embodiment is different in operation of the error signal generation section 123 from that of the first embodiment. The error signal generation section 123 generates an error signal 21 in accordance with a value of information data 10. Remaining functional blocks of the second embodiment are the same as those of the first embodiment, and thus description thereof will be omitted.

Figure 11:
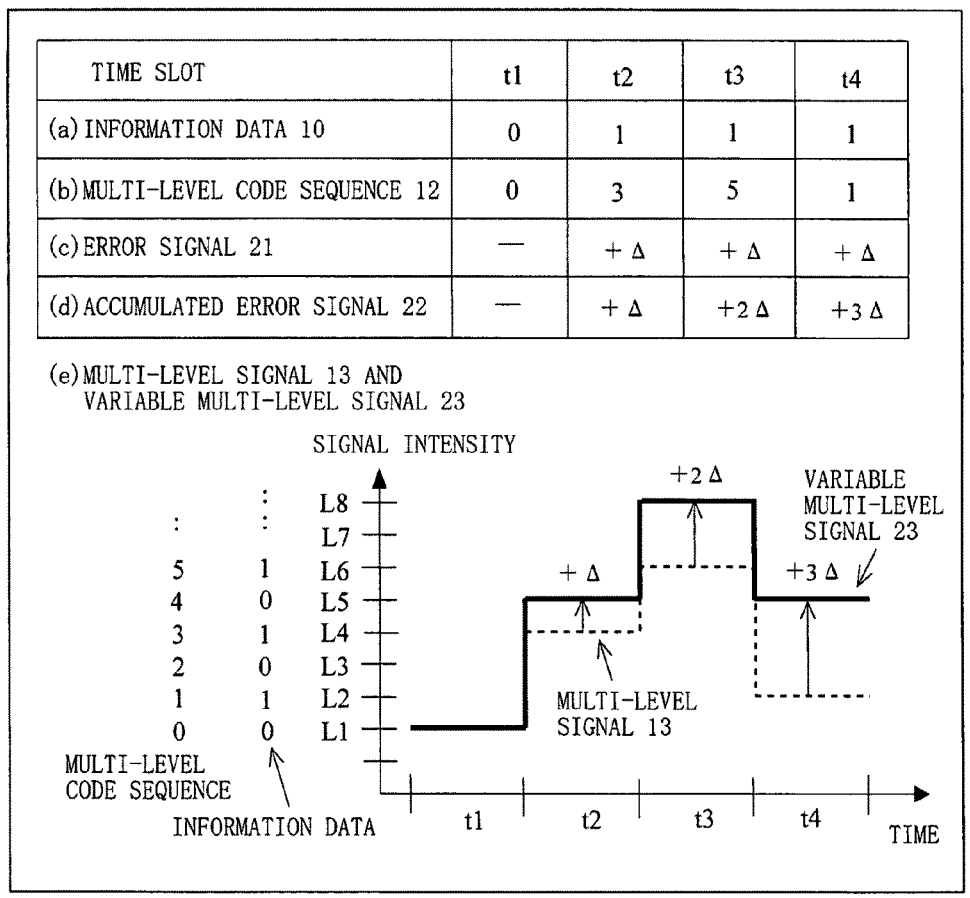
FIG. 11 is a schematic diagram illustrating a signal form used for the data communication apparatus 2 according to the second embodiment of the present invention.

FIG. 11 is a schematic diagram illustrating a signal form used for the data communication apparatus 2 according to the second embodiment of the present invention. In the present embodiment, the error signal generation section 123 correlates the value of the information data 10 with a value of the error signal 21 in accordance with a predetermined rule. According to an example shown in FIG. 11, the error signal generation section 123 sets a value of the error signal 21 to "+Δ" in the case where the value of the information data 10 is "1", and sets a value of the error signal 21 to "−Δ" in the case where the value of the information data 10 is "0". In this case, a value of an accumulated error signal 22, a value of the multi-level signal 13, and a value of a variable multi-level signal 23 are those shown in (d) and (e) of FIG. 11, and it is possible to obtain the same effect as the first embodiment in that a variation range of the variable multi-level signal 23 expands with time.

Figure 12:
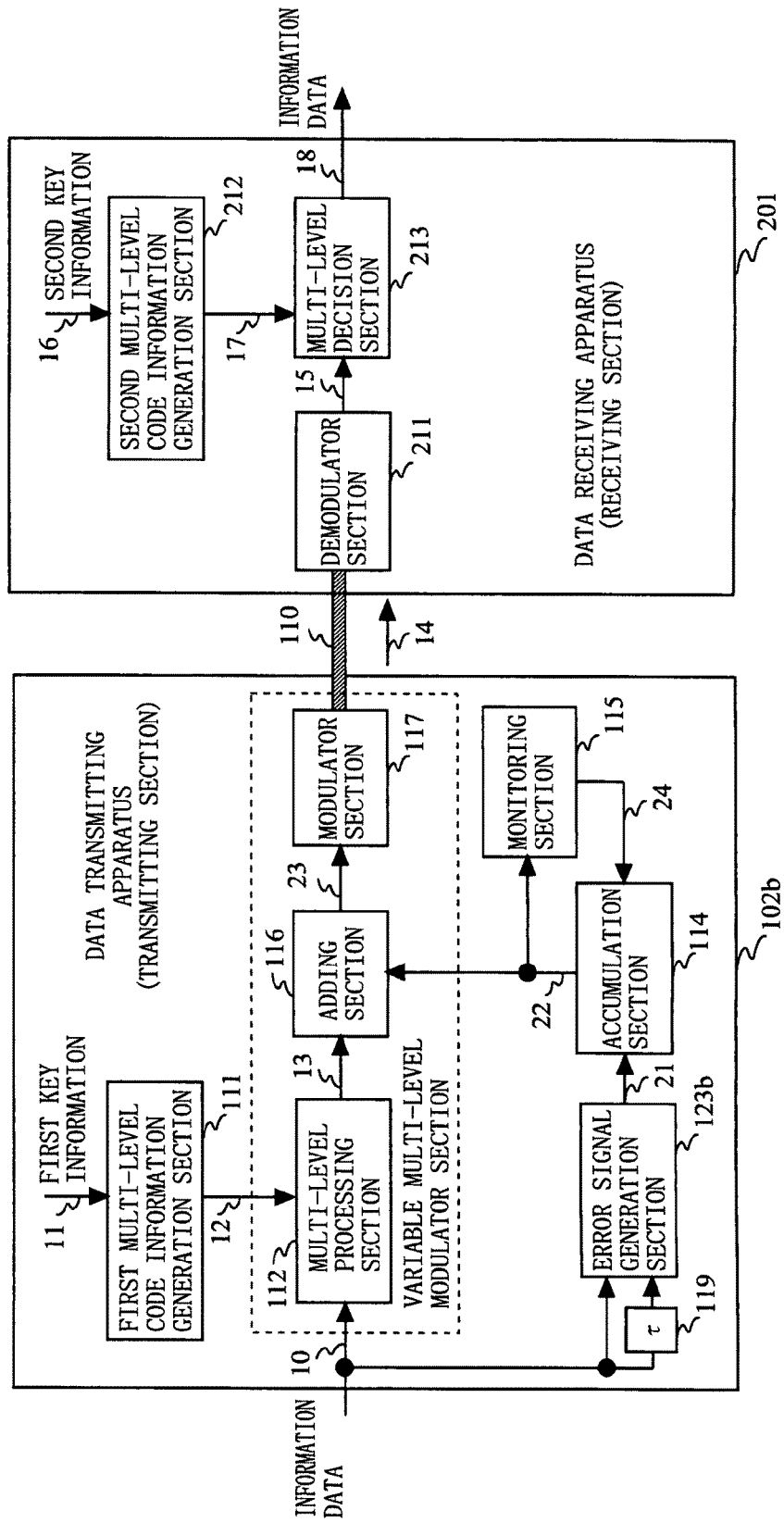
FIG. 12 is a block diagram showing an exemplary configuration of a data communication apparatus 2b according to the second embodiment of the present invention.
Figure 13:
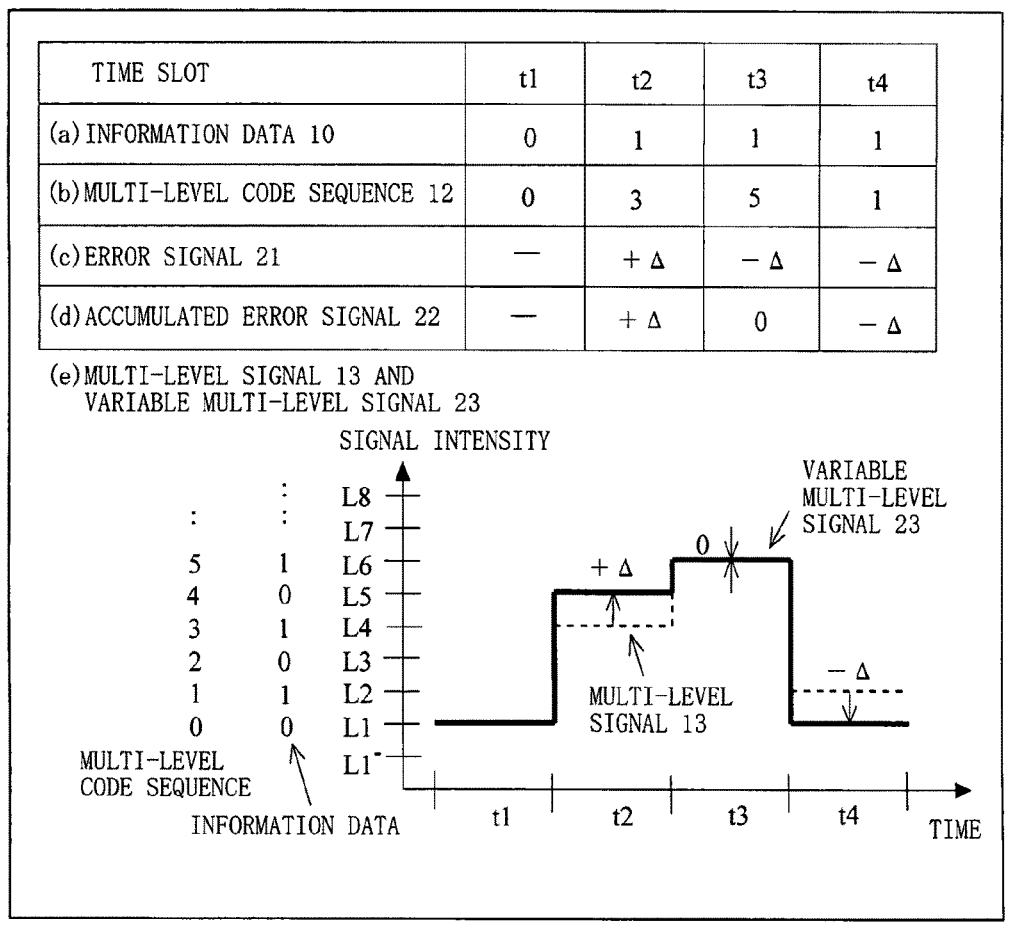
FIG. 13 is a schematic diagram illustrating a signal form used for the data communication apparatus 2b according to the second embodiment of the present invention.

The relation between the information data 10 and the error signal 21 in the present embodiment is not limited to a one-to-one relation as above described. The error signal 21 may be also correlated with a transition between a preceding bit and a following bit of the information data 10. FIG. 12 shows an exemplary configuration of the data communication apparatus 2b in this case. In the data communication apparatus 2b shown in FIG. 12, the transmitting section 102b further includes a delaying section 119 compared to the transmitting section 102 shown in FIG. 10. The delaying section 119 delays the information data 10 by predetermined time slots and outputs the delayed information data 10 to an error signal generation section 123b. That is, in the error signal generation section 123b, not only a value of the information data 10 in a current time slot, but also a value of the information data 10 in a given previous time slot is inputted. The error signal generation section 123b generates the error signal 21 by using both of the inputted signals. With reference to FIG. 13, a method in which the error signal generation section 123b generates the error signal 21 will be described.

FIG. 13 is a schematic diagram illustrating a signal form used for the data communication apparatus 2b according to the second embodiment of the present invention. In an example of FIG. 13, in the case where the value of the information data 10 in the current time slot and the value of the information data 10 in the given previous time slot are different from each other, the value of the error signal 21 is "+Δ", whereas in the case where the value of the information data 10 in the current slot and that in the previous slot are identical to each other, the value of the error signal 21 is "−Δ". In this case, the value of the accumulated error signal 22, the value of the multi-level signal 13, and the value of the variable multi-level signal 23 are those shown in (d) and (e) of FIG. 13.

In the present embodiment, as with the first embodiment, the value of the accumulated error signal 22 is reset by using the recovery signal 24 which is outputted by the monitoring section 115 or the timing output section 118 (not shown), whereby a difference between the variable multi-level signal 23 and the multi-level signal 13 is kept equal to or lower than a predetermined value, and a legitimate receiving party is enabled to constantly receive a signal to be received appropriately.

A relation between the value of the information data 10 and the value of the error signal 21, which is described with reference to FIG. 11 or 13, is merely an example, and the transmitting section 102 can set the value of the error signal 21 to any given value independently of the step width. Further, in the same manner as described in the first embodiment with reference to FIGS. 7, 8, and 9, in the transmitting section 102 of the present embodiment, a position of the adding section 116 may be changed. That is, even in the case where the adding section 116 is located, with respect to the multi-level processing section 112, at any one of an input side of the information data 10, an input side of the multi-level code sequence 12, or a subsequent position to the modulator section 117, the transmitting section 102 can transmit a modulated signal 14 of the same signal form as the modulated signal 14 shown in FIG. 11 or 13.

As above described, as with the first embodiment, according to the data transmitting apparatus 102 based on the second embodiment of the present invention, even in the case where a noise level overlapped on the multi-level signal is smaller than the step width, it is possible to increase the number of the levels of the multi-level signal which may be received by the eavesdropper. Accordingly, the data transmitting apparatus 102 can improve security against eavesdropping without increasing the multi-level number included in the multi-level signal. Further, in the data transmitting apparatus 102, since the multi-level number included in the multi-level signal is not required to be increased, it is possible to simplify the configuration of the apparatus.

Third Embodiment

Figure 14:
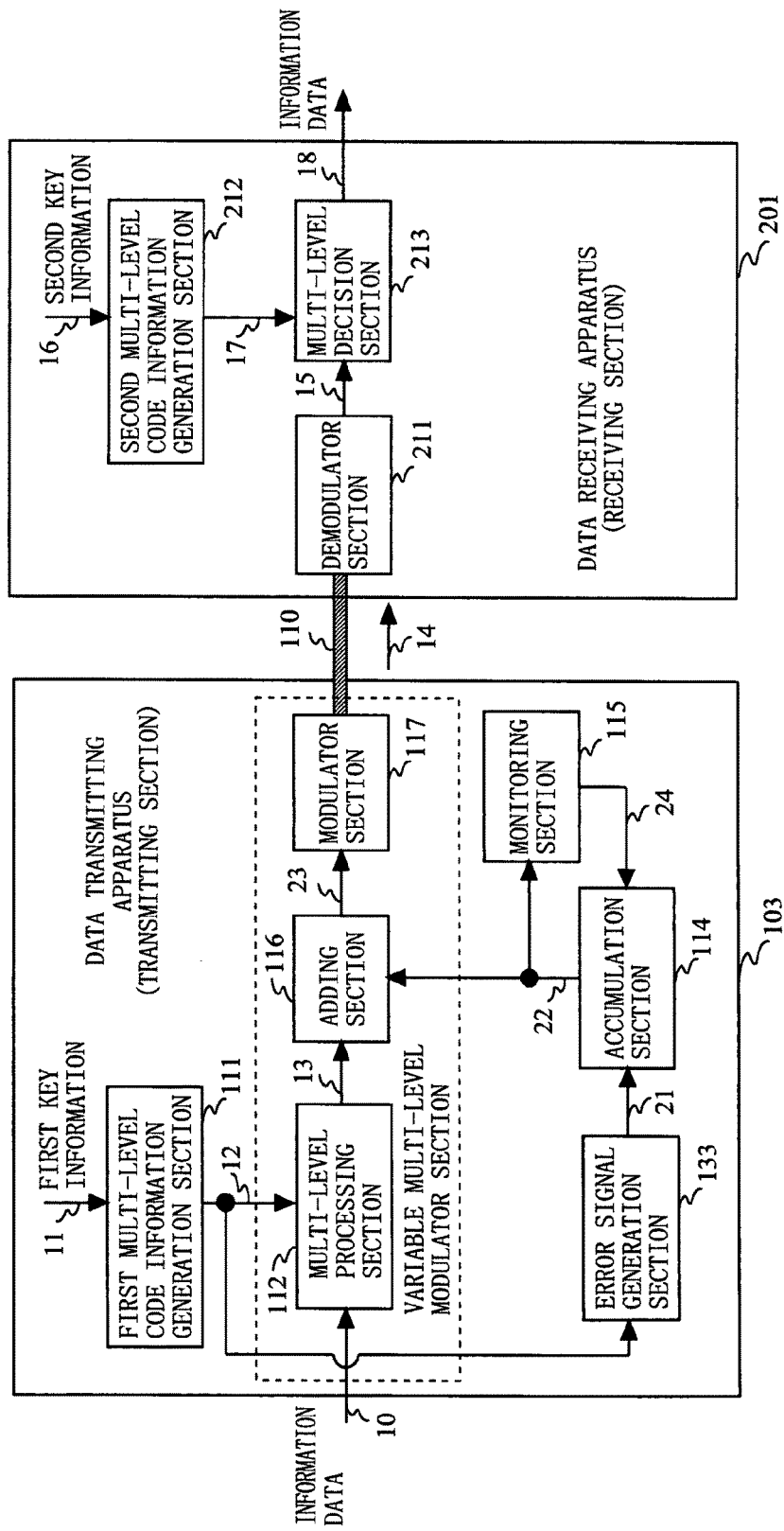
FIG. 14 is a block diagram showing an exemplary configuration of a data communication apparatus 3 according to a third embodiment of the present invention.

FIG. 14 is a block diagram showing an exemplary configuration of a data communication apparatus 3 according to a third embodiment of the present invention. As shown in FIG. 14, the data communication apparatus 3 has a configuration in which a transmitting section 103 and a receiving section 201 are connected to each other via a transmission line 110. The transmitting section 103 includes a first multi-level code generation section 111, a multi-level processing section 112, an error signal generation section 133, an accumulation section 114, a monitoring section 115, an adding section 116, and a modulator section 117. The receiving section 201 includes a demodulator section 211, a second multi-level code generation section 212, and a decision section 213. The data communication apparatus 3 according to the third embodiment is different in operation of the error signal generation section 133 from the first embodiment. The error signal generation section 133 generates an error signal 21 in accordance with a value of a multi-level code sequence 12. Since remaining function blocks are the same as those of the first embodiment, the description thereof will be omitted.

Figure 15:
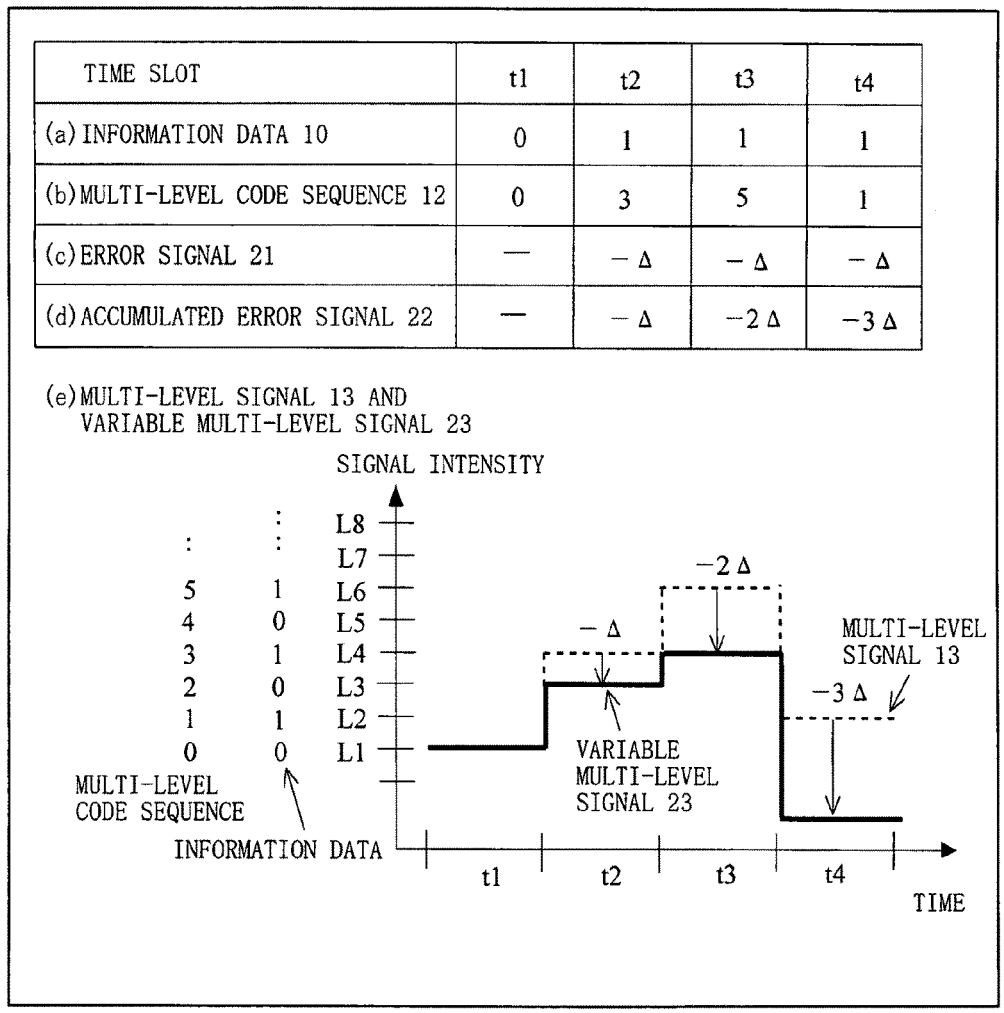
FIG. 15 is a schematic diagram illustrating a signal form used for the data communication apparatus 3 according to the third embodiment of the present invention.

FIG. 15 is a schematic diagram illustrating a signal form used for the data communication apparatus 3 according to the third embodiment of the present invention. In the present embodiment, the error signal generation section 133 correlates the value of the multi-level code sequence 12 with the value of the error signal 21. In an example of FIG. 15, the error signal generation section 133 sets the value of the error signal 21 to "+Δ", in the case where the value of the multi-level code sequence 12 is even-numbered, whereas the value of the error signal 21 is set to "−Δ" in the case where the value of the multi-level code sequence 12 is odd-numbered. In this case, the value of the accumulated error signal 22, the value of the multi-level signal 13, and the value of the variable multi-level signal 23 are those shown in (d) and (e) of FIG. 15, and the same effect as the first embodiment can be obtained in that a variation range of the variable multi-level signal 23 expands with time.

Figure 16:
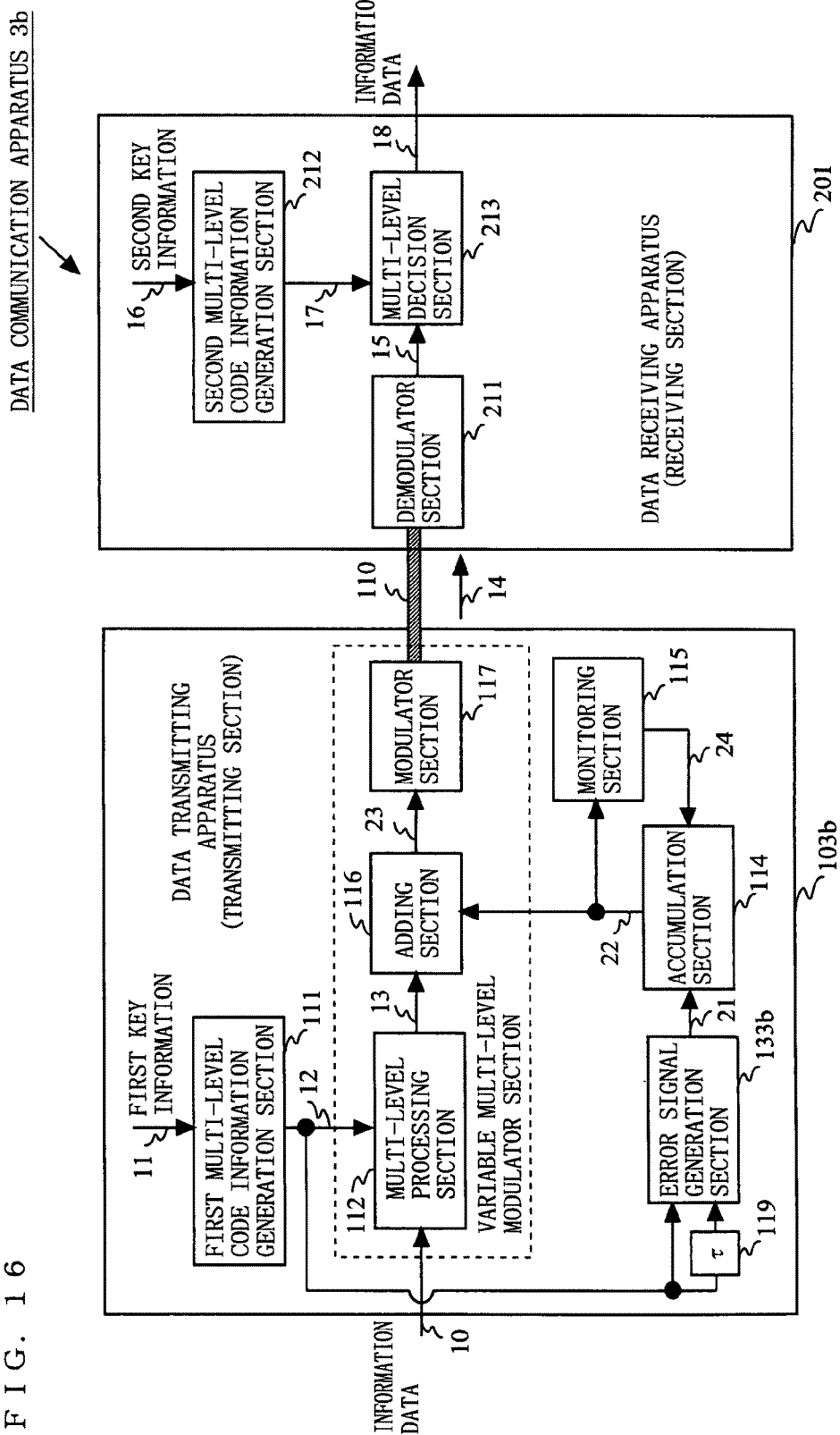
FIG. 16 is a block diagram showing an exemplary configuration of a data communication apparatus 3b according to the third embodiment of the present invention.

The relation between the multi-level code sequence 12 and the error signal 21 in the present embodiment is not limited to one-to-one relation as above described. The error signal 21 may be also correlated with a transition between a preceding bit and a following bit of the information data 10. FIG. 16 shows an exemplary configuration of the data communication apparatus 3b in this case. In the data communication apparatus 3b shown in FIG. 16, the transmitting section 103b further includes a delaying section 119 compared to the transmitting section 103 shown in FIG. 14. The delaying section 119 delays the multi-level code sequence 12 by predetermined time slots and outputs the delayed multi-level code sequence 12 to an error signal generation section 133b. That is, in the error signal generation section 133b, not only a value of the multi-level code sequence 12 in a current time slot, but also a value of the multi-level code sequence 12 in any previous time slot is inputted. The error signal generation section 133b generates the error signal 21 by using both of the inputted signals. With reference to FIG. 17, a method in which the error signal generation section 133b generates the error signal 21 will be described.

FIG. 17 is a schematic diagram illustrating a signal form used for the data communication apparatus 3b according to the third embodiment of the present invention. In an example shown in FIG. 17, in the case where the value of the multi-level code sequence 12 in the current time slot and that in a previous time slot changes from an even number to an odd number, or from the odd number to the even number, the value of the error signal 21 is "+Δ", whereas in the case where the value of the multi-level code sequence 12 in the current time slot and that in the previous time slot remain even-numbered or odd-numbered, the value of the error signal 21 is "−Δ". In this case, the value of the accumulated error signal 22, the value of the multi-level signal 13, and the value of the variable multi-level signal 23 are those shown in (d) and (e) of FIG. 17.

In the present embodiment, as with the first embodiment, the value of the accumulated error signal 22 is reset by using the recovery signal 24 which is outputted by the monitoring section 115 or the timing output section 118 (not shown), whereby a difference between the variable multi-level signal 23 and the multi-level signal 13 is kept equal to or lower than a predetermined value, and a legitimate receiving party is enabled to constantly receive a signal to be received appropriately.

A relation between the value of the multi-level code sequence 12 and the value of the error signal 21, which is described with reference to FIG. 15 or 17, is merely an example, and the transmitting section 103 can set the value of the error signal 21 to any given value independently of the step width. Further, in an example shown in FIG. 15, the error signal generation section 133 decides the value of the error signal 21 depending on whether the value of the multi-level code sequence 12 is odd-numbered or even-numbered. However, the correlation between the multi-level code sequence 12 and the error signal 21 is not limited thereto. The multi-level code sequence 12 may be divided into two groups in accordance with a given reference, and the value of the error signal 21 may be correlated with each of the two groups. Further, in an example shown in FIG. 17, the error signal generation section 133b may differentiates whether the value of the multi-level code sequence 12 in the current time slot and the previous time slot changes within a single group, or changes between different groups, and then correlate the value of the error signal 21 with this differentiation.

In the same manner as described in the first embodiment with reference to FIGS. 7, 8, and 9, in the transmitting section 103 of this embodiment, a position of the adding section 116 may be changed. That is, even in the case where the adding section 116 is located, with respect to the multi-level processing section 112, at any one of an input side of the information data 10, an input side of the multi-level code sequence 12, or a subsequent position to the modulator section 117, the transmitting section 103 can transmit a modulated signal 14 of the same signal form as the modulated signal 14 shown in FIG. 15 or 17.

As above described, as with the first embodiment, according to the data transmitting apparatus 103 based on the third embodiment of the present invention, even in the case where a noise level overlapped on the multi-level signal is smaller than the step width, it is possible to increase the number of the levels of the multi-level signal which are likely to be received by the eavesdropper. Accordingly, the data transmitting apparatus 103 can improve security against eavesdropping without increasing the multi-level number included in the multi-level signal. Further, in the data transmitting apparatus 102, since the number of the multi-level included in the multi-level signal is not required to be increased, it is possible to simplify the configuration of the apparatus.

The data communication apparatus according to the present invention is useful as a secret communication apparatus or the like which is safe and insusceptible to eavesdropping and interception.

While the invention has been described in detail, the foregoing description is in all aspects illustrative and not restrictive. It is understood that numerous other modifications and variations can be devised without departing from the scope of the invention.

What is claimed is:

1. A data transmitting apparatus for encrypting information data by using previously shared key information and performing secret communication with a receiving apparatus, the data transmitting apparatus comprising:
    a multi-level code generation section for generating, based on the key information, a multi-level code sequence in which a signal level changes so as to be random numbers;
    an error signal generation section for generating an error signal having a value which changes at a same bit rate as the information data;
    an accumulation section for accumulating the error signal and outputting an accumulated error signal; and
    a variable multi-level modulator section for generating, based on the information data, the multi-level code sequence and the accumulated error signal, a variable multi-level signal which corresponds to a combination between the information data and the multi-level code sequence and which has a level which changes based on the accumulated error signal, for modulating, in a predetermined modulation method, the variable multi-level signal having been generated, and for outputting a modulated signal.

2. The data transmitting apparatus according to claim 1, wherein
    the variable multi-level modulator section includes:
        a multi-level processing section for combining the information data and the multi-level code sequence, and generating a multi-level signal having a level which corresponds to the combination between the information data and the multi-level code sequence;
        an adding section for adding the multi-level signal to the accumulated error signal, and outputting the variable multi-level signal; and
        a modulator section for modulating the variable multi-level signal in the predetermined modulation method, and outputting the modulated signal.

3. The data transmitting apparatus according to claim 1, wherein
    the variable multi-level modulator section includes:
        an adding section for adding the information data to the accumulated error signal, and outputting variable information data;
        a multi-level processing section for combining the variable information data and the multi-level code sequence in accordance with predetermined processing, generating a signal having a level which corresponds to a level of a combination between the variable information data and the multi-level code sequence, and outputting the variable multi-level signal; and
        a modulator section for modulating the variable multi-level signal in the predetermined modulation method, and outputting the modulated signal.

4. The data transmitting apparatus according to claim 1, wherein
    the variable multi-level modulator section includes:
        an adding section for adding the multi-level code sequence to the accumulated error signal, and outputting a variable multi-level code sequence;
        a multi-level processing section for combining the information data and the variable multi-level code sequence in accordance with predetermined processing, generating a signal having a level which corresponds to a combination between the information data and the variable multi-level code sequence, and outputting the variable multi-level signal; and
        a modulator section for modulating the variable multi-level signal in the predetermined modulation method, and outputting the modulated signal.

5. The data transmitting apparatus according to claim 1, wherein
    the variable multi-level modulator section includes:
        a multi-level processing section for combining the information data and the multi-level code sequence in accordance with predetermined processing, and generating a multi-level signal having a level which corresponds to the combination between the information data and the multi-level code sequence;
        a first modulator section for modulating the multi-level signal in a predetermined modulation method, and outputting a multi-level modulated signal;
        a second modulator section for modulating the accumulated error signal in the predetermined modulation method, and outputting a modulated accumulated error signal; and
        an adding section for adding the multi-level modulated signal to the modulated accumulated error signal, and outputting a resultant signal as the modulated signal of the variable multi-level signal.

6. The data transmitting apparatus according to claim 1, further comprising a monitoring section for monitoring the accumulated error signal outputted by the accumulation section, and, in the case where an absolute value of the accumulated error signal exceeds a predetermined criteria value, outputting, to the accumulation section, a recovery signal which provides an instruction to reset a value of the accumulated error signal to a predetermined value.

7. The data transmitting apparatus according to claim 1, further comprising a timing output section for outputting, at a timing of a predetermined cycle, a recovery signal which provides an instruction to reset a value of the accumulated error signal to a predetermined value.

8. The data transmitting apparatus according to claim 6, wherein a ratio of an information amplitude, which corresponds to an amplitude of the information data, to the predetermined criteria value is larger than a signal-to-noise ratio acceptable to a legitimate receiving party.

9. The data transmitting apparatus according to claim 6, wherein the accumulation section resets the value of the accumulated error signal to "0" when the recovery signal is inputted.

10. The data transmitting apparatus according to claim 7, wherein the accumulation section resets the value of the accumulated error signal to "0" when the recovery signal is inputted.

11. The data transmitting apparatus according to claim 6, wherein the accumulation section sets the value of the accumulated error signal lower than the predetermined criteria value when the recovery signal is inputted.

12. The data transmitting apparatus according to claim 7, wherein the accumulation section sets the value of the accumulated error signal lower than the predetermined criteria value when the recovery signal is inputted.

13. The data transmitting apparatus according to claim 1, wherein
the error signal generation section includes:
a controlling random number generation section for generating a controlling random number having a value which changes randomly at a same bit rate as the information data;
and an error signal conversion section for deciding, based on a value of the controlling random number, the value which changes at the same bit rate as the information data, and outputting a resultant value as the error signal.

14. The data transmitting apparatus according to claim 13, wherein the controlling random number is a pseudo random number generated based on a predetermined initial value.

15. The data transmitting apparatus according to claim 13, wherein the controlling random number is a physical random number generated by using physical phenomena.

16. The data transmitting apparatus according to claim 1, wherein the error signal generation section generates the error signal in accordance with a value of the information data.

17. The data transmitting apparatus according to claim 1, wherein the error signal generation section generates the error signal in accordance with a transition of a value of the information data.

18. The data transmitting apparatus according to claim 1, wherein the error signal generation section generates the error signal in accordance with a value of the multi-level code sequence.

19. The data transmitting apparatus according to claim 1, wherein the error signal generation section generates the error signal in accordance with a transition of a value of the multi-level code sequence.

* * * * *